United States Patent
Nishikawa et al.

(10) Patent No.: US 7,362,465 B2
(45) Date of Patent: Apr. 22, 2008

(54) INFORMATION PROCESSING APPARATUS AND CONTROL METHOD THEREFOR

(75) Inventors: Satoshi Nishikawa, Kanagawa (JP); Koji Nakagiri, Kanagawa (JP); Yasuo Mori, Kanagaw (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 10/184,900

(22) Filed: Jul. 1, 2002

(65) Prior Publication Data
US 2003/0007181 A1 Jan. 9, 2003

(30) Foreign Application Priority Data
Jul. 4, 2001 (JP) .............................. 2001-203769

(51) Int. Cl.
G06K 15/00 (2006.01)
B42C 11/00 (2006.01)
B42C 9/00 (2006.01)

(52) U.S. Cl. ..................... 358/1.16; 358/1.17; 412/4; 412/6

(58) Field of Classification Search ................ 358/468, 358/1.11, 1.15, 1.16, 1.17, 1.18; 355/71, 355/82; 270/37, 1.01, 52.14, 52.18, 52.2, 270/58.08; 715/525; 364/468.03; 412/2, 412/6, 11, 13, 20, 25, 33, 35, 1.18, 4; 281/21.1; 283/38, 42; 116/238, 239; 400/24
See application file for complete search history.

(56) References Cited

U.S. PATENT DOCUMENTS

| | | | | |
|---|---|---|---|---|
| 4,592,651 A | * | 6/1986 | Oikawa et al. | ................ 355/72 |
| 5,108,081 A | * | 4/1992 | Russel et al. | ................. 270/37 |
| 5,377,965 A | * | 1/1995 | Mandel et al. | ................ 270/37 |
| 5,696,605 A | * | 12/1997 | Miller et al. | ................ 358/468 |
| 5,774,363 A | * | 6/1998 | Sato et al. | .................... 700/97 |
| 6,307,637 B1 | | 10/2001 | Kujirai | ...................... 358/1.11 |
| 6,952,801 B2 | * | 10/2005 | Warmus et al. | ............. 715/525 |
| 7,061,636 B2 | * | 6/2006 | Ryan et al. | ................ 358/1.15 |

OTHER PUBLICATIONS www.dictionary.com, definitions for "fascicle" and "collated".*

* cited by examiner

*Primary Examiner*—Jerome Grant, II
(74) *Attorney, Agent, or Firm*—Fitzpatrick, Cella, Harper & Scinto

(57) ABSTRACT

Whether fascicle setting of bookbinding printing is designated is determined. When printing in several bundles is designated, imposition processing and drawing processing are performed on a plurality of printing surfaces on the basis of the fascicle setting. After each fascicle is printed, notification processing which prompts a printer driver to issue a saddle stitch command is executed. Fascicle processing of bookbinding printing can be transmitted as one printing job to a printer, and the fascicle bookbinding printing function can be realized.

9 Claims, 24 Drawing Sheets

FIG. 10

| | |
|---|---|
| JOB-IDENTIFIABLE ID | ~1001 |
| JOB SETTING INFORMATION | ~1002 |
| NUMBER OF PHYSICAL PAGES OF JOB | ~1003 |
| FIRST PHYSICAL PAGE INFORMATION | ~1004 |
| SECOND PHYSICAL PAGE INFORMATION | ~1005 |
| . . . | ~1006 |
| FINAL PHYSICAL PAGE INFORMATION | ~1007 |

FIG. 11

| | |
|---|---|
| TOTAL NUMBER OF PHYSICAL PAGES | ~1101 |
| TOTAL NUMBER OF LOGICAL PAGES | ~1102 |
| NUMBER OF COPIES | ~1103 |
| PRINTING OF EACH COPY | ~1104 |
| FINISHING INFORMATION | ~1105 |
| ADDITIONAL PRINTING INFORMATION | ~1106 |

FIG. 12

| | |
|---|---|
| PHYSICAL PAGE NUMBER | ~1201 |
| PHYSICAL PAGE SETTING INFORMATION | ~1202 |
| NUMBER n OF LOGICAL PAGES ASSIGNED TO PHYSICAL PAGE | ~1203 |
| FIRST LOGICAL PAGE INFORMATION | ~1204 |
| SECOND LOGICAL PAGE INFORMATION | ~1205 |
| . . . | ~1206 |
| nTH LOGICAL PAGE INFORMATION | ~1207 |

INFORMATION PROCESSING APPARATUS AND CONTROL METHOD THEREFOR

FIELD OF THE INVENTION

The present invention relates to an information processing apparatus, control method therefor, program, and storage medium.

BACKGROUND OF THE INVENTION

In a conventional printing system constituted by an output apparatus such as a printer or copying machine and an information processing apparatus such as a personal computer communicable with the output apparatus, a document created by an application of the information processing apparatus is printed and bound by the output apparatus. In this case, if fascicle printing of printing pages in separate bundles is designated, the information processing apparatus performs imposition processing and drawing processing on a printing surface for each fascicle. Then, the information processing apparatus transmits printing information to the output apparatus as a plurality of printing jobs.

The prior art realizes the fascicle bookbinding function by dividing a printing job into a plurality of jobs. A plurality of jobs undesirably appear on a system spooler, and each job must be stopped to stop printing.

In addition, re-printing, copying, delete, or the like must be designated every printing job in saving a printing job in a device box. A password or section ID must be input every printing job.

SUMMARY OF THE INVENTION

The present invention has been made to overcome the conventional drawbacks, and has as its object to provide a fascicle bookbinding printing function by one printing job.

It is another object of the present invention to facilitate stop, delete, and the like for a printing job of performing fascicle bookbinding printing.

To achieve the above objects, according to an aspect of the present invention, there is provided an information processing apparatus comprising: determination means for determining whether fascicle setting of bookbinding printing is designated; imposition means for performing imposition processing on a plurality of printing surfaces on the basis of the fascicle setting when the fascicle setting of bookbinding printing is designated; and job generation means for generating printing information having undergone imposition for each fascicle as one printing job processed by a printing apparatus.

According to another aspect, there is provided a control method for an information processing apparatus, the method comprising the steps of: determining whether fascicle setting of bookbinding printing is designated; performing imposition processing on a plurality of printing surfaces on the basis of the fascicle setting when the fascicle setting of bookbinding printing is designated; and generating printing information having undergone imposition for each fascicle as one printing job processed by a printing apparatus.

According to still another aspect, there is provided a program which causes a computer to function as determination means for determining whether fascicle setting of bookbinding printing is designated; imposition means for performing imposition processing on a plurality of printing surfaces on the basis of the fascicle setting when the fascicle setting of bookbinding printing is designated; and job generation means for generating printing information having undergone imposition for each fascicle as one printing job processed by a printing apparatus.

According to still another aspect, there is provided a computer-readable recording medium which records a program which causes a computer to function as determination means for determining whether fascicle setting of bookbinding printing is designated; imposition means for performing imposition processing on a plurality of printing surfaces on the basis of the fascicle setting when the fascicle setting of bookbinding printing is designated; and job generation means for generating printing information having undergone imposition for each fascicle as one printing job processed by a printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing an example of a job output setting file in the embodiment;

FIG. 11 is a view showing an example of job setting information in a field 1002 shown in FIG. 10;

FIG. 12 is a view showing an example of physical page information in a field 1004 shown in FIG. 10;

DETAILED DESCRIPTION OF THE PREFERRED EMBODIMENTS

Preferred embodiments according to the present invention will be described in detail below with reference to the accompanying drawings.

Prior to a description of an embodiment which realizes a fascicle bookbinding printing function by one printing job, the arrangement of a system to which the present invention can be applied and which is constituted by an output apparatus such as a printer and an information processing apparatus such as a personal computer connected to the printer via a local I/F or network or communicable with the output apparatus by infrared radiation or wirelessly, and particularly, the apparatus of a printing system which comprises a spooler serving as a spool means for temporarily saving data in a data format (so-called intermediate code) different from that of printing data to be finally transmitted to the printer, a despooler serving as a despool means for generating printing data to be finally transmitted to the printer from the data temporarily saved in the intermediate code format, and a printer driver serving as a means for generating a printer control command will be described.

Figure 1:
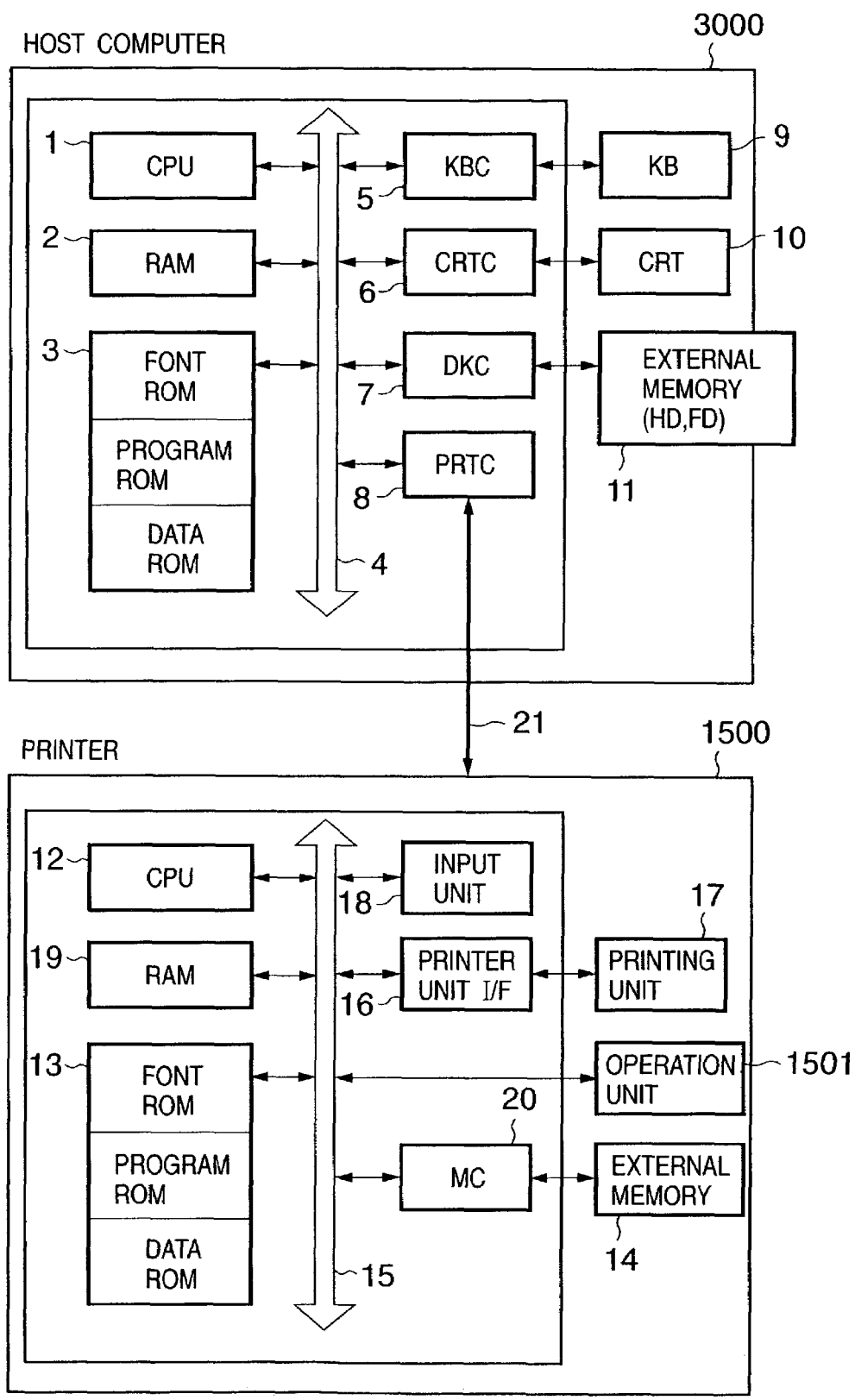
FIG. 1 is a block diagram showing the arrangement of a printer control system in an embodiment.

FIG. 1 is a block diagram showing the arrangement of a printer control system in the embodiment. As shown in FIG. 1, the printer control system is comprised of a host computer 3000 and printer 1500.

The present invention can be applied to a single device, a system constituted by a plurality of devices, or a system which performs processing while being connected via a network such as a LAN or WAN as far as the functions of the present invention are realized.

The host computer 3000 is a preferred example of the information processing apparatus of the present invention. The host computer 3000 comprises a CPU 1 which executes processing for documents containing figures, images, characters, and tables (including spreadsheets and the like) on the basis of a document processing program stored in the program ROM of a ROM 3 or an external memory 11. The CPU 1 integrally controls devices connected to a system bus 4. The program ROM of the ROM 3 or the external memory 11 stores an operating system (to be referred to as an "OS" hereinafter) serving as the control program of the CPU 1. The font ROM of the ROM 3 or the external memory 11 stores font data and the like used in document processing. The data ROM of the ROM 3 or the external memory 11 stores various data used in document processing or the like. A RAM 2 functions as a main memory, work area, and the like for the CPU 1.

In the host computer 3000, reference numeral 5 denotes a keyboard controller (KBC) for controlling an input from a keyboard 9 or a pointing device (not shown); 6, a CRT controller (CRTC) for controlling the display on a CRT display (CRT) 10; 7, a disk controller (DKC) for controlling access to the external memory 11 such as a hard disk (HD) or floppy disk (FD) which stores a boot program, various application programs, font data, user files, an edit file, a printer control command generation program (to be referred to as a "printer driver" hereinafter), and the like; 8, a printer controller (PRTC) which executes communication control processing with the printer 1500 connected via a bidirectional interface (interface) 21.

The CPU 1 executes, e.g., mapping (rasterizing) processing of an outline font to a display information area set on the RAM 2, and enables WYSIWYG on the CRT 10. The CPU 1 opens various registered windows and executes various data processes on the basis of commands designated with a mouse cursor (not shown) on the CRT 10. In executing printing, the user can open a window concerning settings of printing and set a printer and a printing processing method for the printer driver including selection of the printing mode.

In the printer 1500, reference numeral 12 denotes a printer CPU which outputs an image signal as output information to a printing unit (printer engine) 17 connected to a system bus 15 on the basis of a control program stored in the program ROM of a ROM 13 or a control program stored in an external memory 14. The program ROM of the ROM 13 stores the control program of the CPU 12. The font ROM of the ROM 13 stores font data used to generate output information. For a printer having no external memory 14 such as a hard disk, the data ROM of the ROM 13 stores information used on the host computer.

The CPU 12 can communicate with the host computer 3000 via an input unit 18 and notify the host computer 3000 of internal information of the printer 1500. A RAM 19 functions as a main memory, work area, and the like for the CPU 12, and can expand the memory capacity by an optional RAM connected to an expansion port (not shown). The RAM 19 is used as an output information mapping area, environment data storage area, NVRAM, or the like. The external memory 14 such as a hard disk (HD) or IC card is access-controlled by a memory controller (MC) 20. The external memory 14 is connected as an option, and stores font data, emulation programs, form data, and the like. An operation panel 1501 has operation switches, LED indicators, and the like.

The external memory 14 is not limited to one, and a plurality of external memories can be used. A plurality of external memories can be connected which include an optional font card in addition to a built-in font card and store programs for interpreting the printer control languages of different language systems. Further, the printer 1500 may use an NVRAM (not shown) to store printer mode setting information from the operation panel 1501.

Typical printing processing executed in the host computer connected to a printing apparatus such as a printer directly or via a network will be explained.

Figure 2:
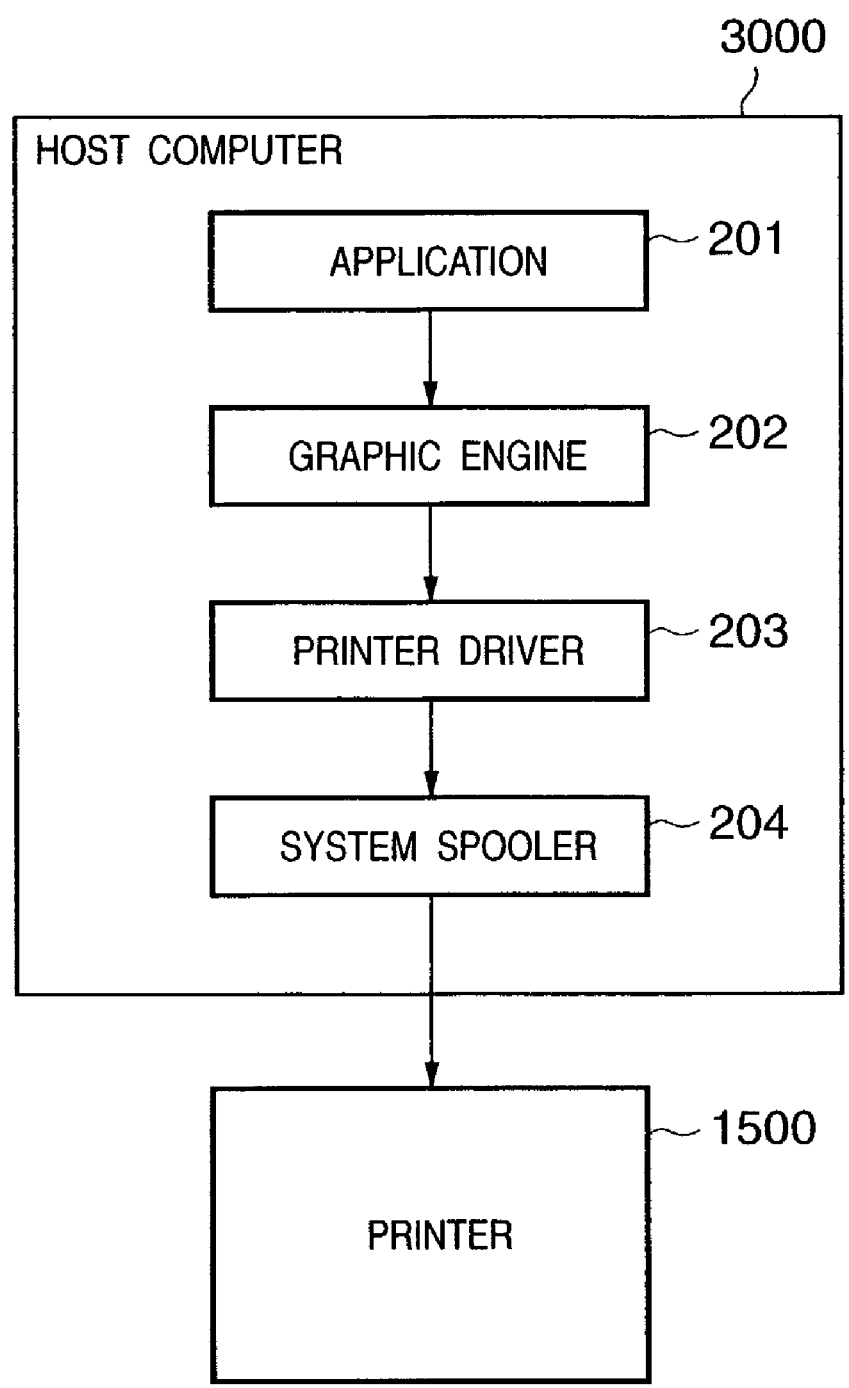
FIG. 2 is a block diagram showing printing processing executed in a host computer 3000.

FIG. 2 is a block diagram showing printing processing executed in the host computer 3000. In FIG. 2, an application 201, graphic engine 202, printer driver 203, and system spooler 204 are program modules existing as files stored in the external memory 11. In execution, the program modules are loaded to the RAM 2 by an OS or modules using these modules. The application 201 and printer driver 203 can be additionally stored in the HD of the external memory 11 from an FD serving as the external memory 11, from a CD-ROM (not shown), or via a network (not shown).

The application 201 saved in the external memory 11 is loaded to the RAM 2 and then executed. If the keyboard 9 or a mouse (not shown) designates to perform printing from the application 201 to the printer 1500, data is output (drawn) using the graphic engine 202 which is similarly loaded to the RAM 2 and becomes executable.

The graphic engine 202 similarly loads the printer driver 203 prepared for each printing apparatus from the external memory 11 to the RAM 2, and sets an output from the application 201 in the printer driver 203. The graphic engine 202 converts a GDI (Graphic Device Interface) function received from the application 201 into a DDI (Device Driver Interface) function, and outputs the DDI function to the printer driver 203.

Then, the printer driver 203 converts a command into a control command, e.g., PDL (Page Description Language) recognizable by the printer 1500 on the basis of the DDI function received from the graphic engine 202. The printer driver 203 transfers the converted printer control command to the system spooler 204 loaded to the RAM 2 by the OS, and outputs the command as printing data to the printer 1500 via the interface 21.

The printing system in the embodiment will be described. In this embodiment, as shown in FIG. 3, printing data from the application is temporarily spooled by intermediate code data in addition to the printing system made up of the printer and host computer shown in FIG. 2.

Figure 3:
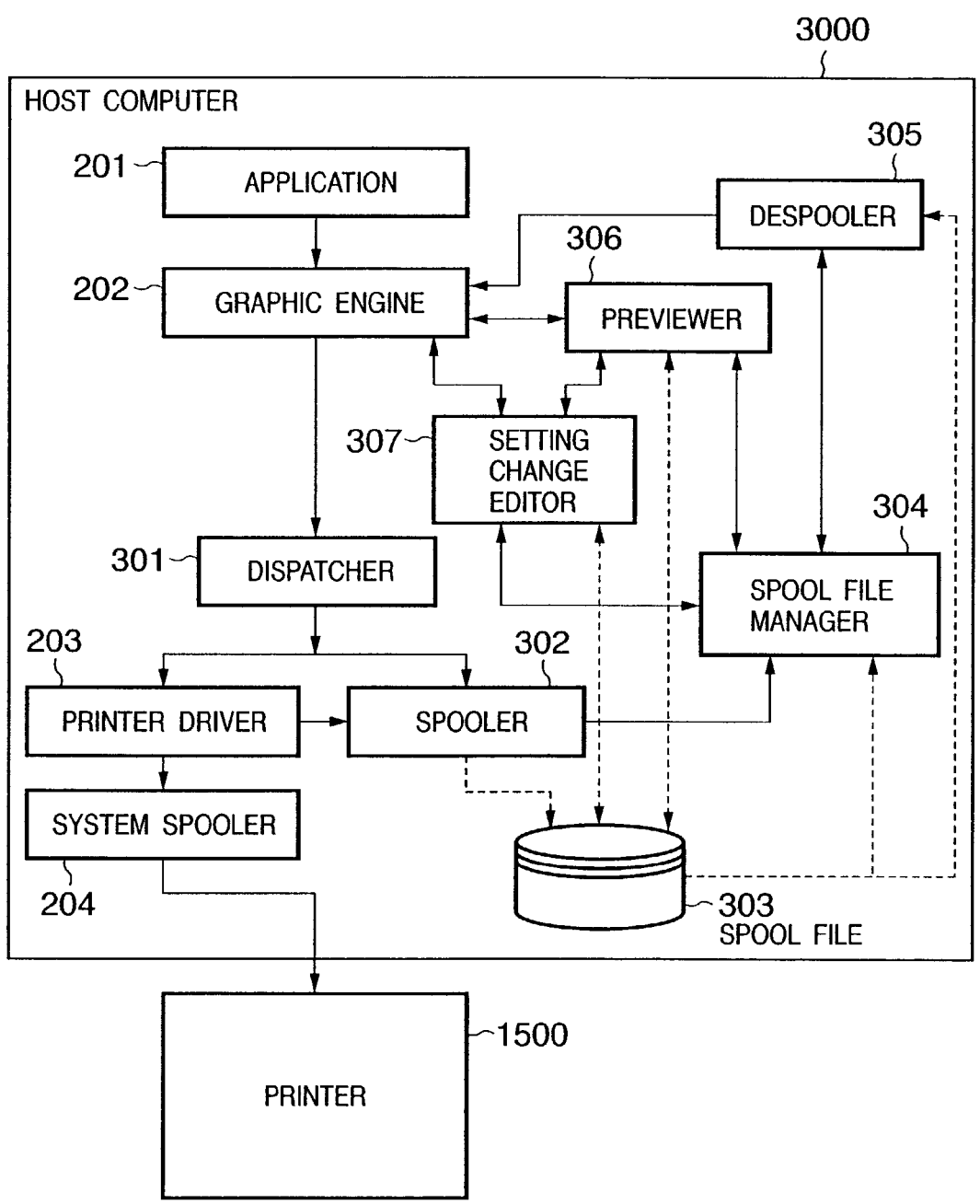
FIG. 3 is a block diagram showing an arrangement in which a printing instruction from an application is temporarily spooled by intermediate code data.

FIG. 3 shows an expansion of the system shown in FIG. 2. When the graphic engine 202 sends a printing instruction to the printer driver 203, a spool file 303 formed from an intermediate code is temporarily generated.

In the system shown in FIG. 2, the application 201 is released from printing processing after the printer driver 203 converts all printing instructions from the printer driver 203 into printer control commands.

To the contrary, in the system shown in FIG. 3, the application 201 is released from printing processing after a spooler 302 converts all printing instructions into intermediate code data and outputs the data to the spool file 303. That is, the system shown in FIG. 3 releases the application 201 from printing processing within a shorter time. The system shown in FIG. 3 can also process the contents of the spool file 303. This system can, therefore, realize functions not provided by the application, such as a function of performing enlargement/reduction for printing data from the application 201 and a function of reducing a plurality of pages into one page and printing the page.

Compared to the system shown in FIG. 2, the system shown in FIG. 3 is so expanded as to spool a printing instruction as intermediate code data. To process printing data, items are generally set on a window provided by the printer driver 203, and the printer driver 203 saves the setting contents in the RAM 2 or external memory 11.

Printing processing of the system shown in FIG. 3 will be explained in detail. As shown in FIG. 3, according to this expanded processing method, a dispatcher 301 receives a DDI function as a printing instruction from the graphic engine 202. When a printing instruction (DDI function) received from the graphic engine 202 is a printing instruction (GDI function) issued from the application 201 to the graphic engine 202, the dispatcher 301 loads the spooler 302 stored in the external memory 11 to the RAM 2, and sends the printing instruction (DDI function) not to the printer driver 203 but to the spooler 302.

The spooler 302 analyzes the received printing instruction, converts it into an intermediate code for each page, and outputs the intermediate code to the spool file 303. The spool file of the intermediate code stored for each page will be called a PDF (Page Description File). The spooler 302 acquires from the printer driver 203 processing settings (bookbinding printing, Nup, double-side printing, staple, color/monochrome, and the like) concerning printing data set for the printer driver 203, and saves the settings as a file for each job in the spool file 303. A setting file stored for each job will be called a job setting file (to be simply referred to as an SDF: Spool Description File). The job setting file will be described later.

Note that the spool file 303 is generated as a file in the external memory 11, but may be generated in the RAM 2. The spooler 302 loads a spool file manager 304 stored in the external memory 11 to the RAM 2, and notifies the spool file manager 304 of the generation status of the spool file 303. The spool file manager 304 then determines whether printing is possible in accordance with the contents of processing settings concerning printing data saved in the spool file 303.

When the spool file manager 304 determines that printing is possible using the graphic engine 202, the spool file manager 304 loads a despooler 305 stored in the external memory 11 to the RAM 2, and instructs the despooler 305 to execute printing processing of a page description file of an intermediate code described in the spool file 303. The despooler 305 processes the page description file of the intermediate code contained in the spool file 303 in accordance with a job setting file containing processing setting information of the spool file 303. The despooler 305 regenerates a GDI function and outputs it again via the graphic engine 202.

When a printing instruction (DDI function) received from the graphic engine 202 is based on a printing instruction (GDI function) issued from the despooler 305 to the graphic engine 202, the dispatcher 301 sends the printing instruction not to the spooler 302 but to the printer driver 203. The printer driver 203 generates a printer control command of a page description language or the like on the basis of the DDI function acquired from the graphic engine 202, and outputs the command to the printer 1500 via the system spooler 204.

FIG. 3 shows an example in which a previewer 306 and setting change editor 307 are added to the above-described expanded system to enable preview, change of printing settings, and binding of a plurality of jobs.

Figure 9:
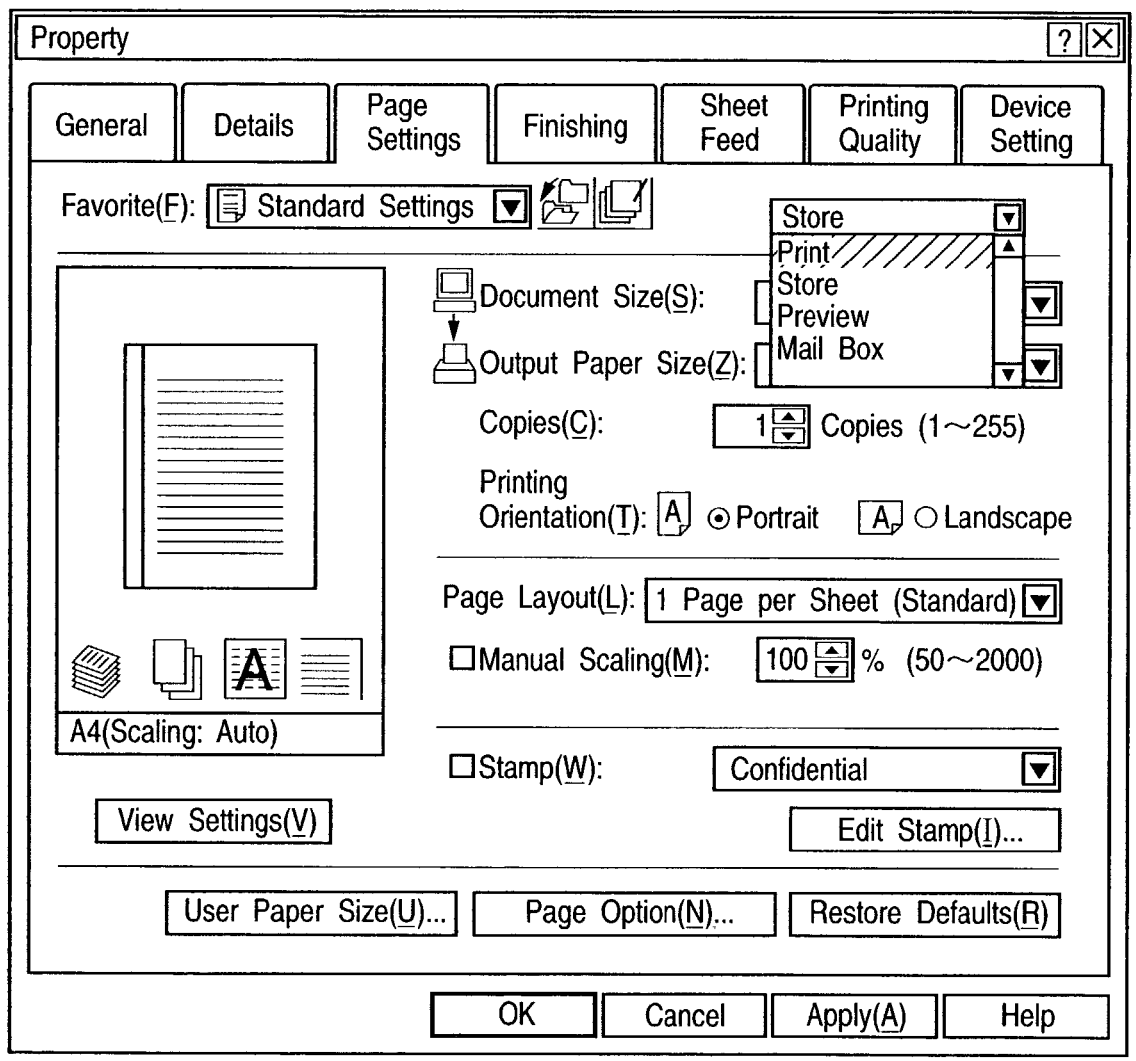
FIG. 9 is a view showing the property window of a printer driver.

To perform printing preview, change of printing settings, and binding of a plurality of jobs, the user must designate "store" on a pull-down menu serving as a means for performing "designate an output destination" on the property window of the printer driver shown in FIG. 9. Only to see a preview, the user can select "preview" as an output destination.

Contents set by the property of the printer driver are stored in a structure (called, e.g., DEVMODE in the Windows OS) provided as a setting file by the OS. This structure contains, e.g., a setting of whether to store data in the spool file manager 304 during processing settings contained in the spool file 303. When the spool file manager 304 is designated to read and store processing settings via the printer driver, a page description file and job setting file are generated and stored in the spool file 303, as described above. Then, the window of the spool file manager pops up and displays a list of jobs spooled in the spool file 303, as shown in FIG. 16.

Figure 16:
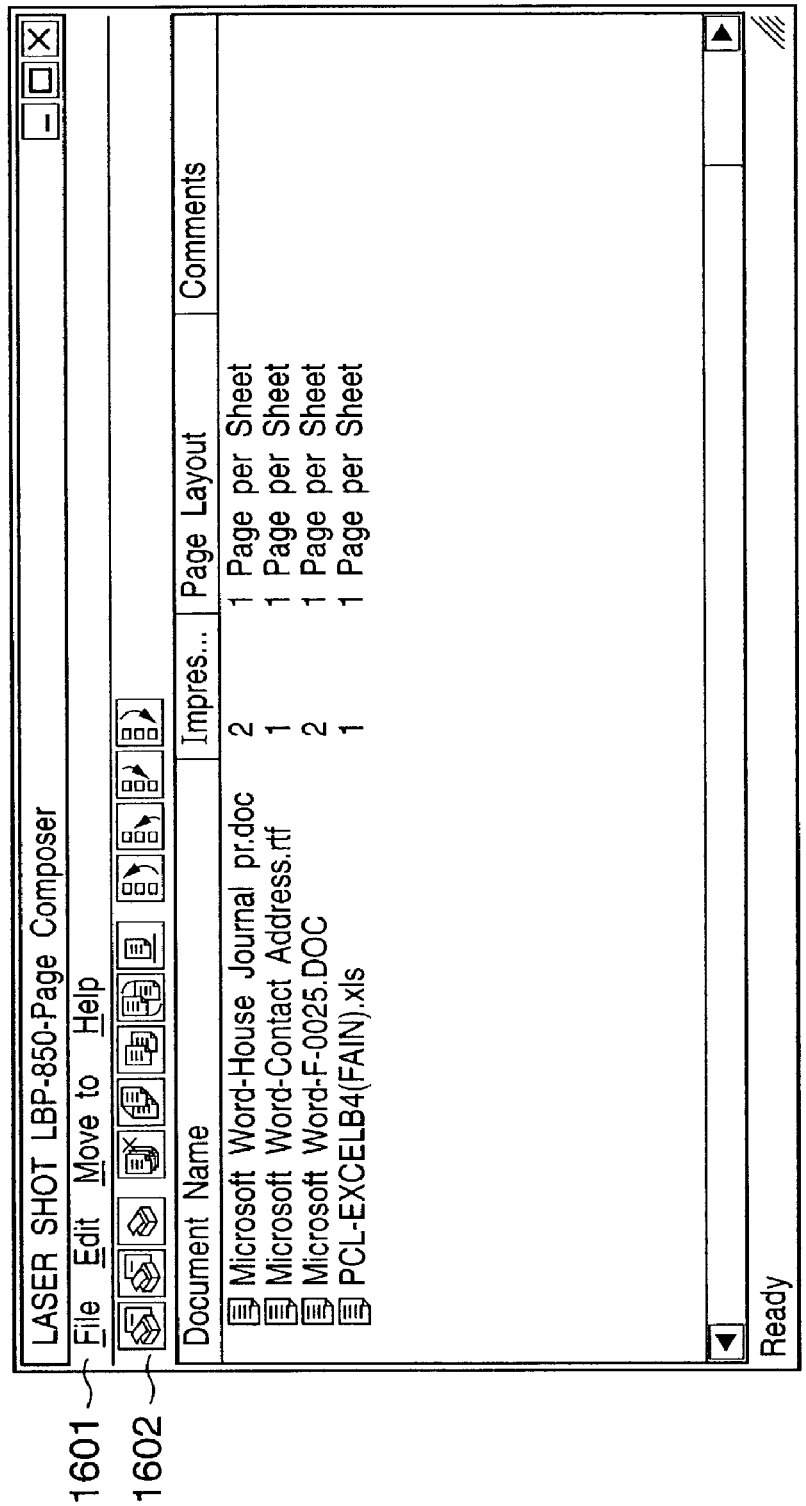
FIG. 16 is a view showing the window of a spool file manager.

FIG. 16 shows an example in which four jobs are spooled. A job operation can be executed by clicking a menu bar 1601 or a menu icon 1602 immediately below the menu bar 1601. The number of operations for the menu bar 1601 is the same as that of the menu icon 1602. Operations are classified into 11 types: "print" while a job is selected; "save and print" of printing a spool file of an intermediate code while saving it; "preview" for checking the output preview of a job considering printing settings; "delete" of deleting a spool file of an intermediate code; "copy" of copying a spool file of an intermediate code; "bind" of binding jobs of spool files of a plurality of intermediate codes; "divide" of dividing a bound job into a plurality of unique jobs; "job edit" of changing the printing settings (layout setting, finishing setting, and the like) of a single or bound job; "move to the start" of moving up the printing order of a desired job to the start; "move up by one" of moving up the printing order of a desired job by one; "move down by one" of moving down the printing order of a desired job by one; and "move to the end" of moving down the printing order of a desired job to the end.

If the preview of a single or bound job is designated on the window of the spool file manager shown in FIG. 16, the previewer 306 stored in the external memory 11 is loaded to the RAM 2 and designated to perform preview processing of a job of an intermediate code described in the spool file 303.

The previewer 306 sequentially reads out page description files (PDFs) of intermediate codes contained in the spool file 303. The previewer 306 processes the readout files in accordance with the contents of processing setting information contained in a job setting file (SDF) stored in the spool file 303, and outputs a GDI function to the graphic engine 202. The graphic engine 202 outputs description data to its client region, and the description data can be output on the window.

The graphic engine 202 can perform proper rendering in accordance with a designated output destination. Thus, similar to the despooler 305, the previewer 306 can be implemented by a method of processing an intermediate code contained in the spool file 303 in accordance with the contents of processing settings contained in the spool file 303 and outputting the processed data by using the graphic engine 202.

In this manner, processing settings in the printer driver 203 are stored as a job setting file in the spool file 303, and data of a page description file is processed and output on the basis of the job setting file. A printing preview closest to an image to be output from the printer can be provided to the user in accordance with an actual description data printing format, designated Nup (processing of reducing and laying out N logical pages to one physical page and printing the physical page), double-side printing, designated bookbinding printing, or a designated stamp.

The preview function of application software such as conventional document creation software shows a preview based on page settings in the application itself. The preview does not reflect printing settings in the printer driver 203, and the user cannot recognize an actually printed/output preview.

Figure 17:
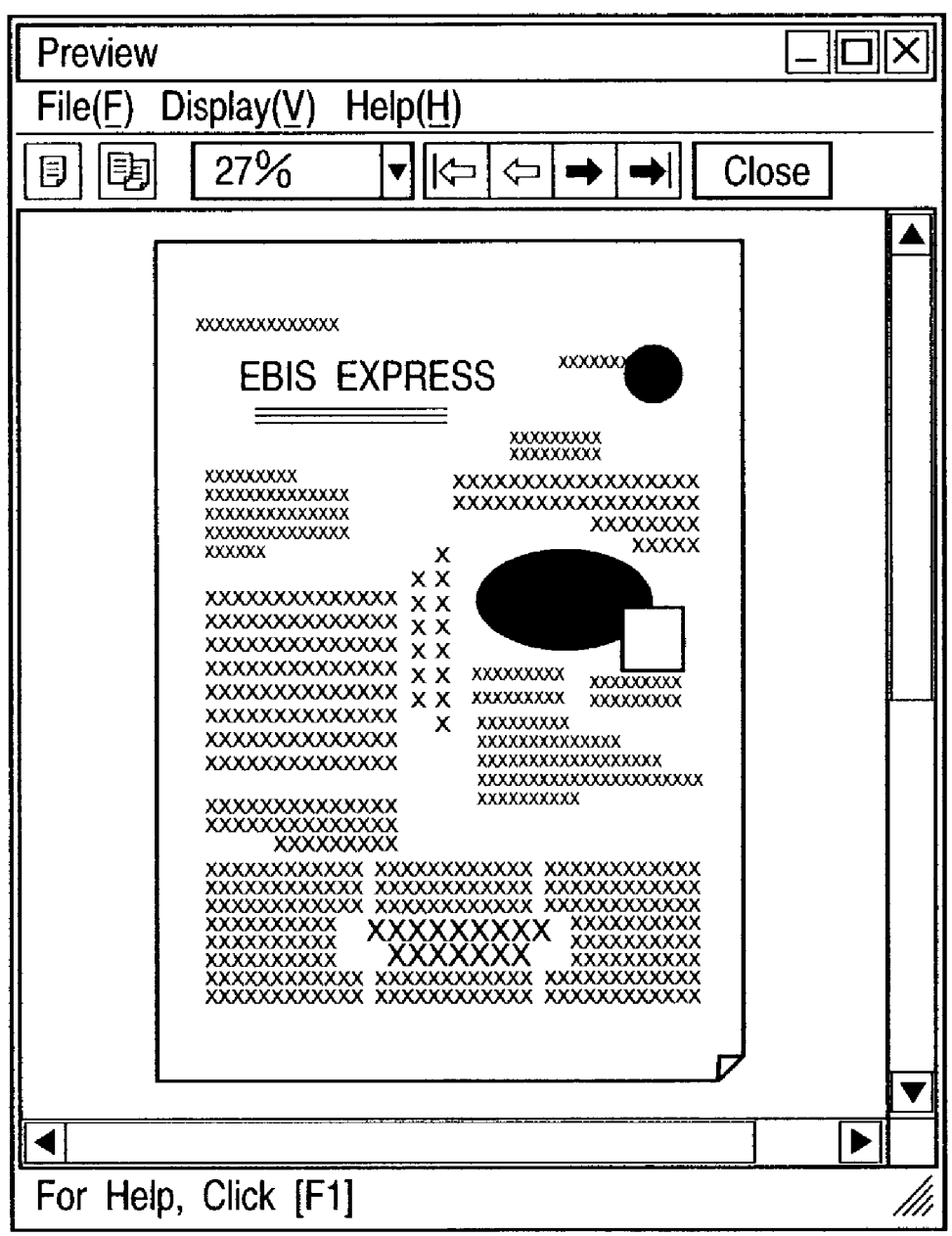
FIG. 17 is a view showing a large preview of printing processing settings contained in a spool file 303.

By the above-mentioned preview processing, the previewer 306 displays on the display a large preview complying with printing processing settings contained in the spool file 303, as shown in FIG. 17. After that, the previewer 306 is closed by a user's non-display instruction, and the control shifts to the window of the spool file manager shown in FIG. 16.

If the user prints an image in accordance with the contents displayed by the previewer 306, he/she designates "print" or "save and print" on the window of the spool file manager 304 and issues a printing request. Then, the despooler 305 processes the page description file on the basis of the job setting file and generates a GDI function. The printing request is transmitted to the graphic engine 202, and the printing instruction is sent to the printer driver 203 via the dispatcher 301, executing printing.

Change of settings by the setting change editor 307 will be explained. Similar to "preview", settings can be changed for a "store"-designated job in FIG. 9. The window of the spool file manager 304 pops up by the above-described processing, and a list of spooled jobs are displayed. When "job edit" is designated on the window of the spool file manager 304 and change of settings is designated, the setting change editor 307 stored in the external memory 11 is loaded to the RAM 2 and instructed to display current or default processing settings. As a result, a job setting window as shown in FIG. 18 is displayed.

Figure 18:
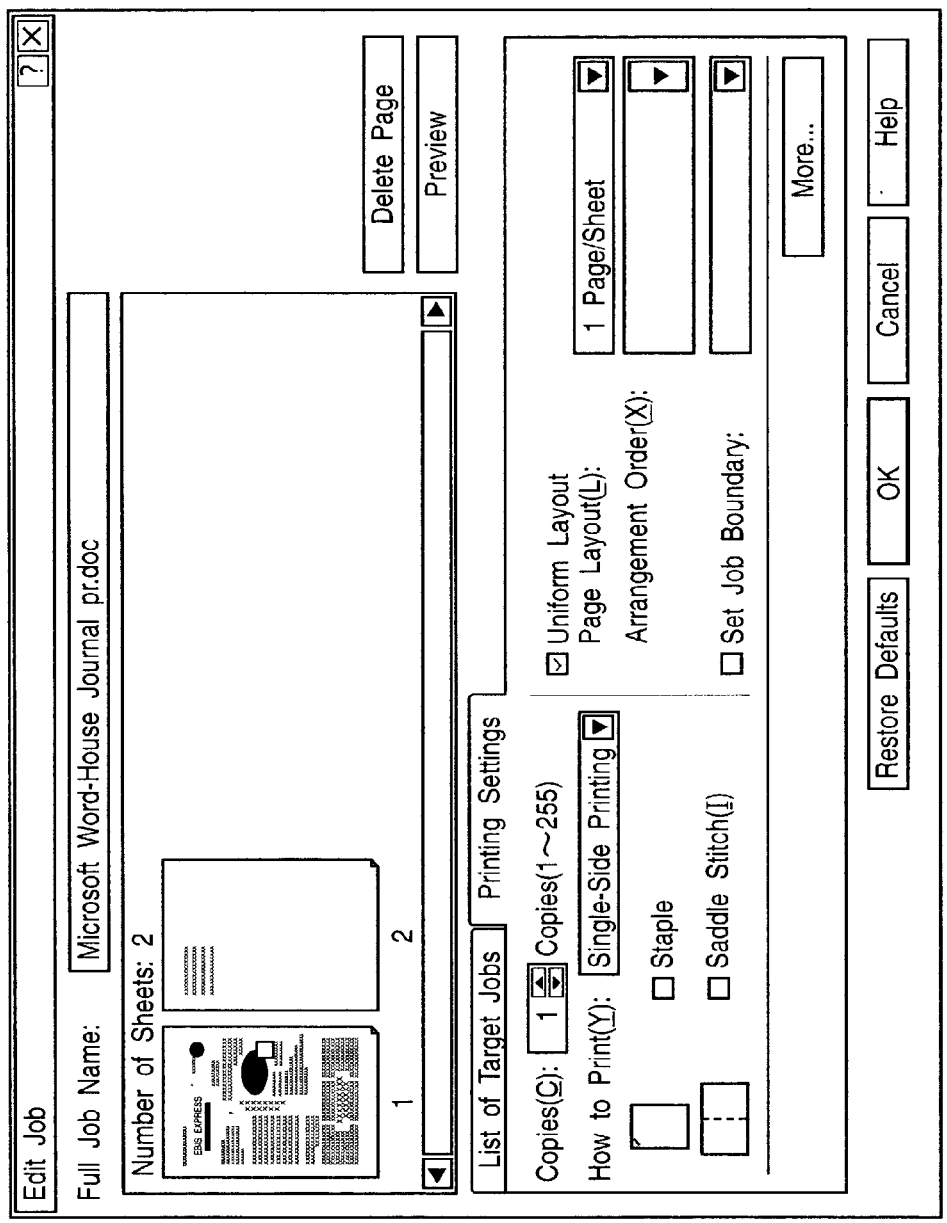
FIG. 18 is a view showing a job setting window.

The setting change editor 307 acquires the job setting file of the "job edit"-designated job from the spool file 303, and changes the default values of the job setting window shown in FIG. 18 on the basis of setting items designated in the job setting file. In the example shown in FIG. 18, "the number of copies: 1", "printing format: single-side", "staple: none", "layout: 1 page/sheet ", and the like are designated in the job setting file of the "job edit"-designated job.

The setting change editor 307 also processes a page description file of an intermediate code contained in the spool file 303 in accordance with the contents of processing settings contained in a job setting file stored in the spool file 303, and outputs the processed data to the client region by using the graphic engine 202. Then, a small preview can be output onto the window shown in FIG. 18.

The contents of processing settings contained in a job setting file stored in the spool file 303 can be changed and corrected. At this time, the user interface of the setting change editor 307 may have the settable items of the printer driver 203 or the user interface of the printer driver 203 itself may be invoked.

As shown in FIG. 18, the user can designate the number of copies, a printing format (single-side printing, double-side printing, or bookbinding printing), a staple (saddle finisher or the like), a page layout, an arrangement order, and the like. By clicking "detailed settings", the user can reset most of items which can be designated by the printer driver. Note that change of settings concerning the printing quality such as the resolution and graphic mode is inhibited.

Changed items are authenticated in accordance with an authentication request on the setting change editor 307, and the control shifts to the spool file manager 304. Changed printing settings which are authenticated are saved, but are not saved in a unique job setting file. Instead, a job output setting file used for editing of a job or the like is newly created, and the authenticated settings are saved in this file. Details of the job output setting file will be described with reference to FIG. 10 and subsequent drawings.

The user similarly confirms the changed settings on the previewer 306, and if printing the image in accordance with the contents of the changed settings, issues a printing request on the spool file manager 304. The printing request is transmitted to the graphic engine 202, and the printing instruction is sent to the printer driver 203 via the dispatcher 301, thus executing printing.

The window of the spool file manager 304 shown in FIG. 16 also allows designating to bind a plurality of printing jobs and print them as one printing job. Similar to "preview" and "change of settings", binding is performed for jobs whose output destinations are designated to "store" in the property of the printer driver shown in FIG. 9.

To bind printing jobs, the user invokes the printer driver 203 from the application 201 and selects "store" on the user interface as shown in FIG. 9. Similar to the above-described cases, printing jobs are stored in the spool file 303 in response to this selection. The window of the spool file manager 304 pops up, as shown in FIG. 16, and a list of spooled jobs are displayed on the window of the spool file manager 304. The same operation via the application 201 also displays a list of jobs on the spool file manager 304.

When the user selects a plurality of jobs and designates "bind", the setting change editor 307 stored in the external memory 11 is loaded to the RAM 2, and instructed to display the first job on the list or default processing settings. Then, a binding setting window as shown in FIG. 18 is displayed. Note that the job setting window of the setting change editor 307 is used as a binding setting window, but the window of another module may be used.

The setting change editor 307 processes a page description file of an intermediate code contained in the spool file 303 in accordance with the contents of processing settings contained in job setting information stored in the spool file 303. The setting change editor 307 outputs the processed data to the client region by using the graphic engine 202 for all jobs to be bound. At this time, a small preview of all the selected jobs can be displayed in the preview region shown in FIG. 18. When a bound job is generated, a job output setting file is also generated by expanding the job setting files of single jobs. The job setting file is also generated in editing a job. One job output setting file is generated for one job, and one job output setting file is also generated for a bound job.

In this case, respective jobs can be displayed with processing settings before binding, or can be changed and corrected to common processing settings and displayed as a bound job. The user interface of the setting change editor 307 may have the settable items of the printer driver 203 or the user interface of the printer driver 203 itself may be invoked.

The bound job and changed items are authenticated in accordance with an authentication request on the setting change editor 307, as described above, and the control shifts to the spool file manager 304. Through these operations, a plurality of selected jobs are displayed as one bound job on the window of the spool file manager.

The user similarly confirms the bound job on the previewer 306, and if printing the image in accordance with the contents of the changed settings, issues a printing request on the spool file manager 304. The printing request is transmitted to the graphic engine 202, and the printing instruction is sent to the printer driver 203 via the dispatcher 301, thus executing printing.

The structure of the printer 1500 in the embodiment that performs printing on the basis of a printer control command input from the printer driver 203 via the system spooler 204 will be described.

Figure 4:
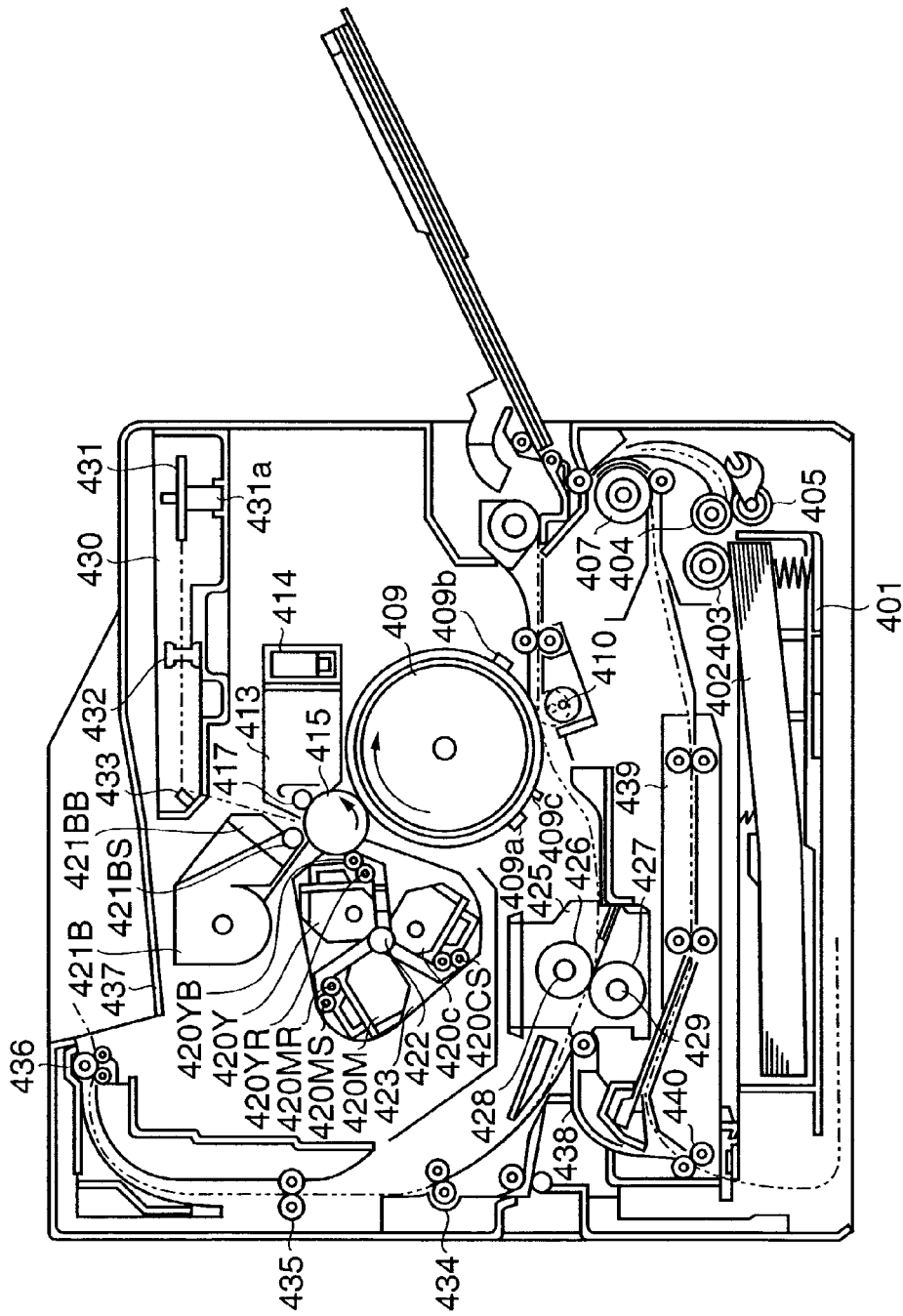
FIG. 4 is a sectional view showing the structure of a printer in the embodiment.

FIG. 4 is a sectional view showing the structure of the printer in the embodiment. A color laser printer having a double-side printing function will be explained as an example of the printer 1500.

As shown in FIG. 4, the printer scans a photosensitive drum 415 via a polygon mirror 431 with a laser beam modulated in accordance with image data of each color obtained on the basis of printing data input from the host computer 3000, thereby forming an electrostatic latent image. The electrostatic latent image is developed with toner into a visible image, and visible images of all the colors are transferred onto an intermediate transfer member 409 to form a color visible image. The color visible image is transferred onto to a transfer member 402 and fixed onto it.

An image forming section which executes this control is made up of a drum unit 413 having the photosensitive drum 415, a primary charging section having a contact charging roller 417, a cleaning section, a developing section, the intermediate transfer member 409, a sheet feed section including a sheet cassette 401 and various rollers 403, 404, 405, and 407, a transfer section including a transfer roller 410, and a fixing section 425.

The drum unit 413 is constituted by integrating the photosensitive drum (photosensitive member) 415 and a cleaner vessel 414 having a cleaning mechanism also serving as the holder of the photosensitive drum 415. The drum unit 413 is detachably supported by the printer main body, and can be easily exchanged in accordance with the service life of the photosensitive drum 415. The aluminum cylinder of the photosensitive drum 415 is coated with an organic photoconductive layer, and the photosensitive drum 415 is rotatably supported by the cleaner vessel 414. The photosensitive drum 415 receives the driving force of a driving motor (not shown) and rotates. The driving motor rotates the photosensitive drum 415 counterclockwise in accordance with image forming operation. The surface of the photosensitive drum 415 is selectively exposed to form an electrostatic latent image.

In a scanner section 430, a modulated laser beam is reflected by the polygon mirror 431 which is rotated by a motor 431a in synchronism with the horizontal sync signal of an image signal. The laser beam irradiates the photosensitive drum 415 via a lens 432 and reflecting mirror 433.

To visualize the electrostatic latent image, the developing section comprises three color developing units 420Y, 420M, and 420C for developing Y (Yellow), M (Magenta), and C (Cyan), and one black developing unit 421B for developing B (Black). The color developing units 420Y, 420M, and 420C and the black developing unit 421B have sleeves 420YS, 420MS, 420CS, and 421BS, and coating blades 420YB, 420MB, 420CB, and 421BB in press contact with the outer surfaces of the sleeves 420YS, 420MS, 420CS, and 421BS. The three color developing units 420Y, 420M, and 420C also have coating rollers 420YR, 420MR, and 420CR.

The black developing unit 421B is detachably mounted in the printer main body. The color developing units 420Y, 420M, and 420C are detachably mounted on a developing rotary 423 which rotates about a rotating shaft 422.

The sleeve 421BS of the black developing unit 421B is arranged at a small interval of about 300 μm from the photosensitive drum 415. The black developing unit 421B conveys toner by an internal supply member, and charges toner by triboelectrification so as to apply toner by the coating blade 421BB to the outer surface of the sleeve 421BS which rotates clockwise. By applying a developing bias to the sleeve 421BS, an electrostatic latent image on the photosensitive drum 415 is developed to form a visible image with black toner on the photosensitive drum 415.

The three color developing units 420Y, 420M, and 420C rotate along with the rotation of the developing rotary 423 in image formation. The predetermined sleeves 420YS, 420MS, and 420CS are arranged at a small interval of about 300 μm from the photosensitive drum 415. The predetermined color developing units 420Y, 420M, and 420C stop at a developing position where they face the photosensitive drum 415, and form visible images on the photosensitive drum 415.

In forming a color image, the developing rotary 423 rotates every rotation of the intermediate transfer member 409. The developing step is sequentially performed by the yellow developing unit 420Y, magenta developing unit 420M, cyan developing unit 420C, and black developing unit 421B. The intermediate transfer member 409 rotates four times to sequentially form visible images with yellow, magenta, cyan, and black toners. As a result, a full-color visible image is formed on the intermediate transfer member 409.

The intermediate transfer member 409 rotates in contact with the photosensitive drum 415 along with the rotation of the photosensitive drum 415. In forming a color image, the intermediate transfer member 409 rotates clockwise, and receives four visible images from the photosensitive drum 415. In forming an image, the transfer roller 410 (to be described later) comes into contact with the intermediate transfer member 409, and clamps and conveys the transfer member 402. As a result, color visible images on the intermediate transfer member 409 are simultaneously transferred onto the transfer member 402. A TOP sensor 409a and RS sensor 409b for detecting the position of the intermediate transfer member 409 in the rotational direction, and a density sensor 409c for detecting the density of a toner image transferred onto the intermediate transfer member 409 are arranged around the intermediate transfer member 409.

The transfer roller 410 comprises a transfer charger supported so as to be brought into contact with or separated from the photosensitive drum 415. The transfer roller 410 is formed by winding an intermediate-resistance foamed elastic member on a metal shaft. As indicated by the solid line in FIG. 4, the transfer roller 410 is apart downward from the photosensitive drum 415 so as not to disturb color visible images while the color visible images are transferred onto the intermediate transfer member 409. After the color visible images of four colors are formed on the intermediate transfer member 409, the transfer roller 410 is moved to an upper position indicated by the dotted line in FIG. 4 by a cam-member (not shown) at a timing at which the color visible images are transferred to the transfer member 402. Then, the transfer roller 410 presses the intermediate transfer member 409 via the transfer member 402 by a predetermined press force, and receives a bias voltage to transfer the color visible images on the intermediate transfer member 409 to the transfer member 402.

The fixing section 425 fixes the transferred color visible image while conveying the transfer member 402. The fixing section 425 comprises a fixing roller 426 which heats the transfer member 402, and a press roller 427 which brings the transfer member 402 into press contact with the fixing roller 426. The fixing roller 426 and press roller 427 are hollow and incorporate heaters 428 and 429, respectively. The transfer member 402 bearing the color visible image is conveyed by the fixing roller 426 and press roller 427, and toner is fixed to the surface of the transfer member 402 by applying heat and a pressure.

The transfer member 402 to which the visible image is fixed is discharged to a discharge section 437 via discharge rollers 434, 435, and 436, and image forming operation ends.

The cleaning means cleans toner left on the photosensitive drum 415 and intermediate transfer member 409. The cleaner vessel 414 stores waste toner left after a visible image formed with toner on the photosensitive drum 415 is transferred to the intermediate transfer member 409, and waste toner left after color visible images of four colors formed on the intermediate transfer member 409 are transferred to the transfer member 402.

The transfer member (printing sheet) 402 used for printing is picked up from the sheet cassette 401 by the pickup roller 403, and conveyed between the intermediate transfer member 409 and the transfer roller 410 to print a color toner image. The transfer member 402 passes through the fixing section 425 to fix the toner image. For single-side printing, a guide 438 forms a convey path so as to guide a printing sheet to the upper discharge section 437. For double-side printing, the guide 438 forms a path so as to guide the printing sheet to a lower double-side printing unit.

The printing sheet guided to the double-side printing unit is temporarily supplied by convey rollers 440 to a lower portion (convey path indicated by the chain double-dashed line) below the tray 401. Then, the printing sheet is conveyed in an opposite direction to a double-side printing tray 439. On the double-side printing tray 439, the sheet is reversed from the state of the sheet set in the sheet cassette 401, and the convey direction of the sheet is also reversed. In this state, a toner image is transferred and fixed again, achieving double-side printing.

A generation process in the spooler 302 in which the spooler 302 receives a printing request from the application 201 via the graphic engine 202 and dispatcher 301, analyzes the printing request, and converts data into an intermediate code for each page to generate a spool file will be explained.

Figure 5:
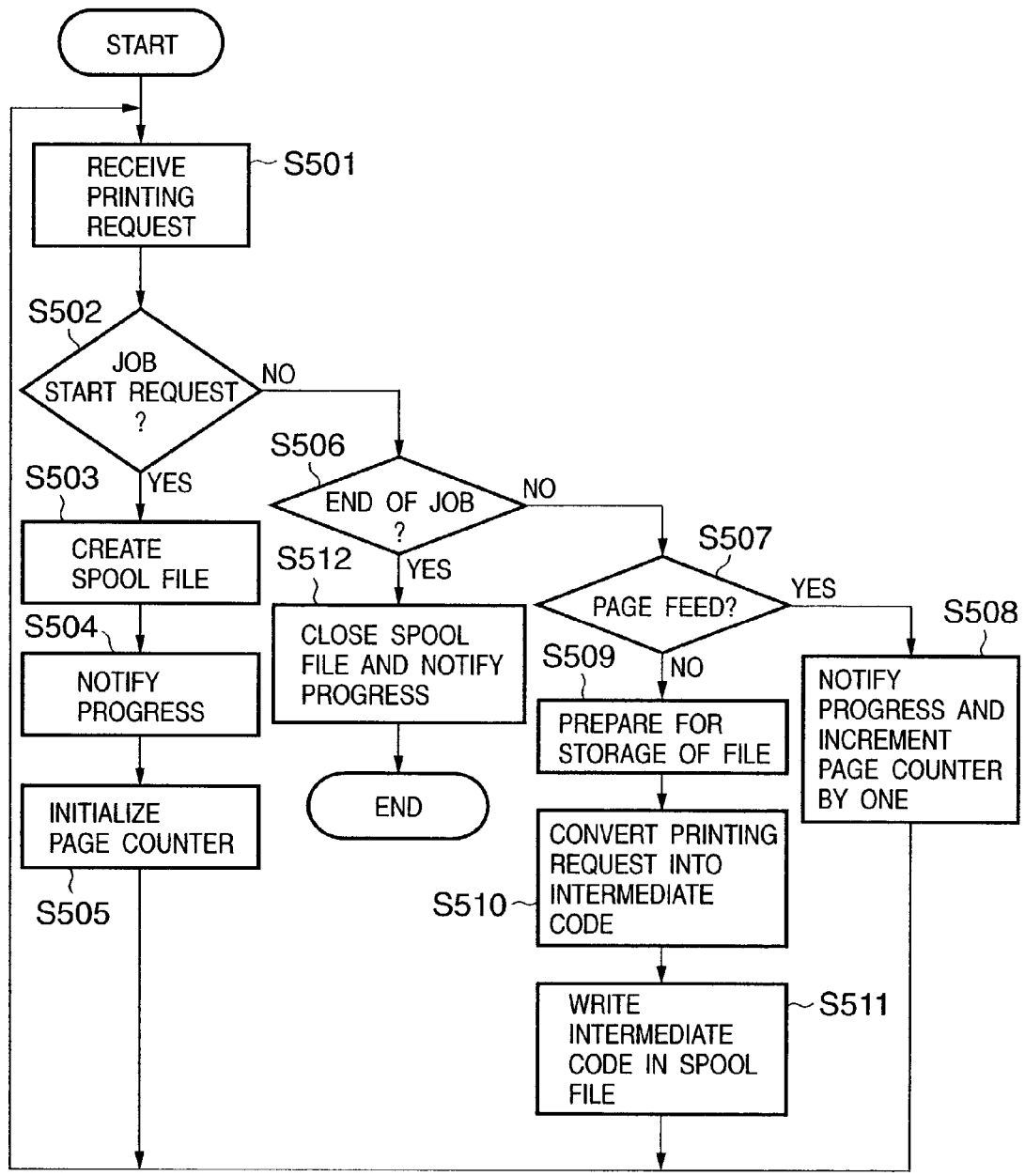
FIG. 5 is a flow chart showing a generation process in a spooler 302.
Figure 8:
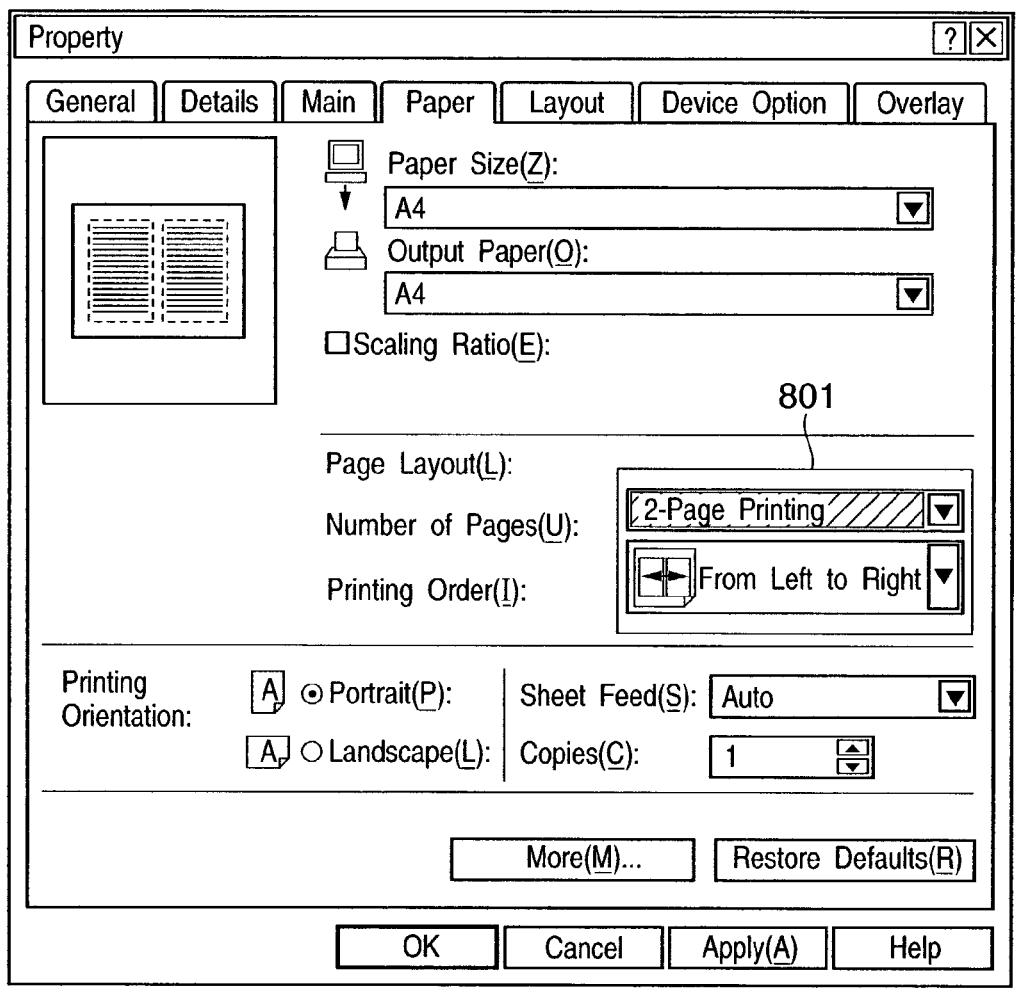
FIG. 8 is a view showing a dialog for inputting printing settings.

FIG. 5 is a flow chart showing the generation process in the spooler 302. In step S501, the spooler 302 receives a printing request from the application 201 via the graphic engine 202 and dispatcher 301. The application 201 displays a dialog for inputting printing settings as shown in FIG. 8, and printing settings input from the dialog are transferred to the spooler 302 via the printer driver 203. The setting input dialog shown in FIG. 8 includes a setting item 801 for determining the number of logical pages to be laid out on one physical page.

In step S502, the spooler 302 checks whether the received printing request is a job start request. If YES in step S502, the spooler 302 advances to step S503 and creates a spool file 303 for temporarily saving intermediate data. In step S504, the spooler 302 notifies the spool file manager 304 of the progress of printing processing. In step S505, the page counter of the spooler 302 is initialized to "1". The spool file manager 304 reads job setting information, processing settings, and the like for the printing-started job from the spool file 303, and stores them.

If NO in step S502, the spooler 302 advances to step S506 and checks whether the received request is a job end request. If NO in step S506, the spooler 302 shifts to step S507 and checks whether page feed is designated. If YES in step S507, the spooler 302 shifts to step S508 and notifies the spool file manager 304 of the progress of printing processing. Further, the spooler 302 increments the page counter, closes a page description file which stores an intermediate code, and generates the next page description file.

If NO in step S507, the spooler 302 advances to step S509 and prepares for write of an intermediate code in a page description file. In step S510, the spooler 302 converts the DDI function of the printing request into an intermediate code in order to store the printing request in the spool file 303. In step S511, the spooler 302 writes the printing request (intermediate code) converted into a storable format in step S510 in the page description file of the spool file 303. The spooler 302 returns to step S501, and receives a printing request from the application 201 again.

A series of processes from step S501 to step S511 continue until the spooler 302 receives a job end request (End Doc) from the application 201. The spooler 302 acquires information such as processing settings stored in the DEVMODE structure from the printer driver 203, and stores the information as a job setting file in the spool file 303. If the spooler 302 determines in step S506 that the printing request from the application 201 is a job end request, this means that all the printing requests from the application 201 have been performed. Thus, the spooler 302 shifts to step S512, notifies the spool file manager 304 of the progress of printing processing, and ends the processing.

A process in which the spool file manager 304 receives a progress notification from the spooler 302 or despooler 305 and controls the generation process of the spooler 302 and the printing data generation process (to be described later) of the despooler 305 will be explained.

Figure 6:
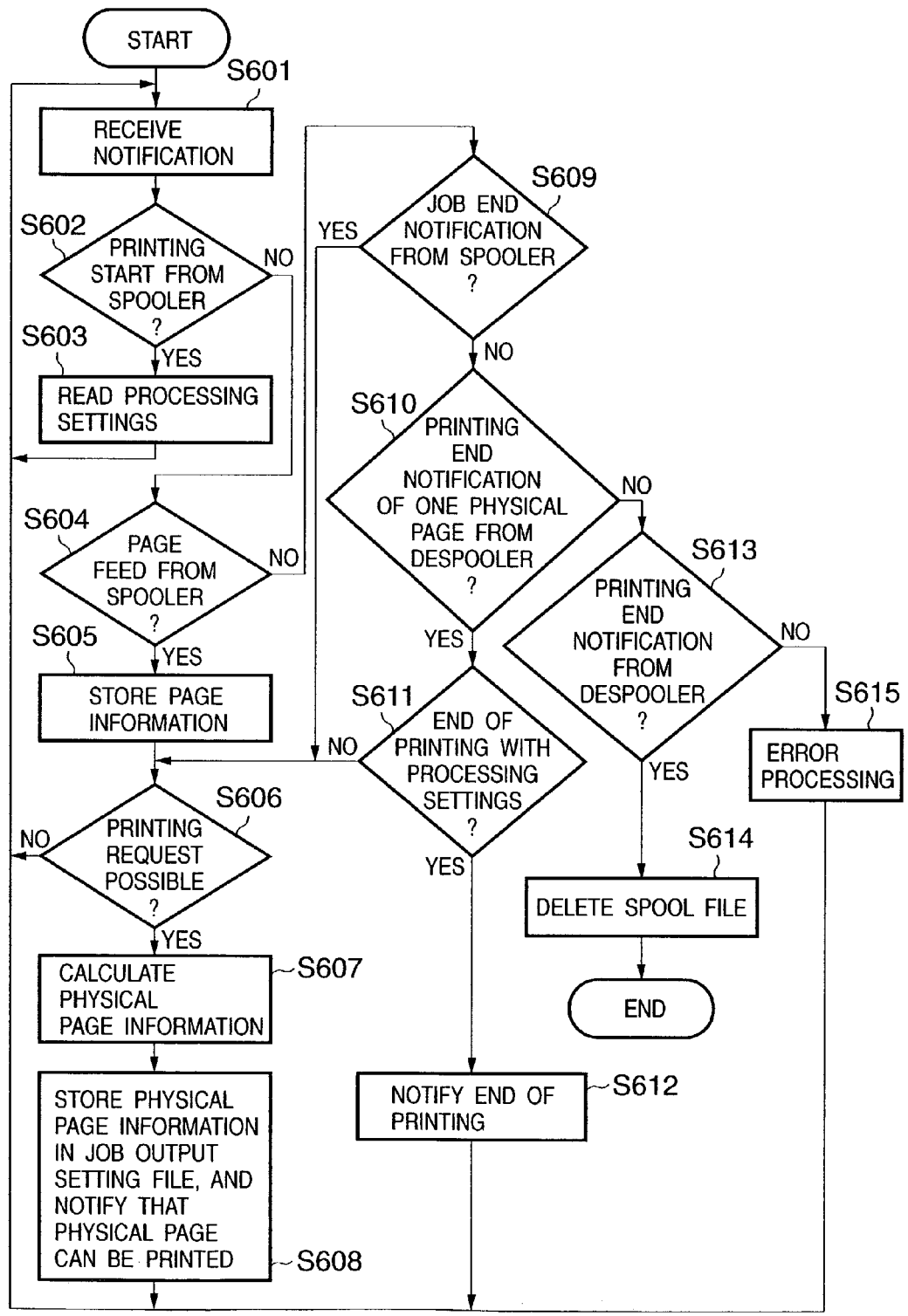
FIG. 6 is a flow chart showing the control of a spool file manager 304.

FIG. 6 is a flow chart showing the control of the spool file manager 304. In step S601, the spool file manager 304 receives a printing processing progress notification from the spooler 302 or despooler 305. In step S602, the spool file manager 304 checks whether the progress notification is a printing start notification sent from the spooler 302 in step S504 shown in FIG. 5. If YES in step S602, the spool file manager 304 shifts to step S603, reads printing processing settings from the spool file 303, and starts job management.

If NO in step S602, the spool file manager 304 shifts to step S604 and checks whether the progress notification is a printing end (page feed) notification of one logical page from the spooler 302 in step S508 shown in FIG. 5. If YES in step S604, the spool file manager 304 advances to step S605 and stores logical page information corresponding to this logical page. In step S606, the spool file manager 304 checks whether printing of one physical page can be started for n spooled logical pages. If YES in step S606, the spool file manager 304 advances to step S607 and determines a physical page number from the number of logical pages assigned to one physical page to be printed.

As for calculation of a physical page, when processing settings represent that four logical pages are arranged on one physical page, the first physical page can be printed after the fourth logical page is spooled. Similarly, the second physical page can be printed after the eighth logical page is spooled.

Even if a total number of logical pages is not a multiple of the number of logical pages arranged on one physical page, logical pages to be arranged on one physical page can be determined by a spool end notification in step S512 shown in FIG. 5.

In step S608, the spool file manager 304 saves, in a job output setting file (file containing physical page information), information such as logical page numbers which constitute a printable physical page, and the physical page number. The spool file manager 304 notifies the despooler 305 that physical page information of one physical page has been added. The spool file manager 304 returns to step S601, and waits for the next notification. The job output setting file will be described later with reference to FIG. 10.

In this way, the embodiment can perform printing processing when printing data of one page, i.e., logical pages which constitute one physical page are spooled even before all the printing jobs are spooled.

If NO in step S604, the spool file manager 304 shifts to step S609 and checks whether the notification is a job end notification from the spooler 302 in step S512 shown in FIG. 5. If YES in step S609, the spool file manager 304 shifts to step S606 described above; if NO, shifts to step S610 and checks whether the received notification is a printing end notification of one physical page from the despooler 305. If YES in step S610, the spool file manager 304 shifts to step S611 and checks whether printing with processing settings is completed. If YES in step S611, the spool file manager 304 advances to step S612 and notifies the despooler 305 of the end of printing; if NO, advances to step S606 described above.

The despooler 305 in this embodiment assumes one physical page as the unit of printing processing. In step S608, information necessary to print one physical page is saved and converted into a reusable format. If information need not be reused, each physical page is rewritten on a high-speed medium such as a shared memory, increasing the speed and saving the resource. When the progress of the spooler 302 is higher than that of the despooler 305 or the despooler 305 starts after all pages are spooled, a page printing enable notification is not sent every physical page in step S608. Instead, the notification is changed in accordance with the progress of the despooler 305 to a content that a plurality of or all physical pages can be printed, decreasing the number of notifications.

If NO in step S610, the spool file manager 304 advances to step S613 and checks whether the notification is a printing end notification from the despooler 305. If YES in step S613, the spool file manager 304 advances to step S614, deletes a corresponding page description file from the spool file 303, and ends the processing. If NO in step S613, the spool file manager 304 advances to step S615, performs another general processing (e.g., error processing), and waits for the next notification.

A printing data generation process in which the despooler 305 reads out necessary information (page description file, job setting file, or the like) from the spool file 303 and generates printing data in response to a printing request from the spool file manager 304 will be explained. A method of transferring generated printing data to the printer 1500 has already been described with reference to FIG. 3.

Figure 7:
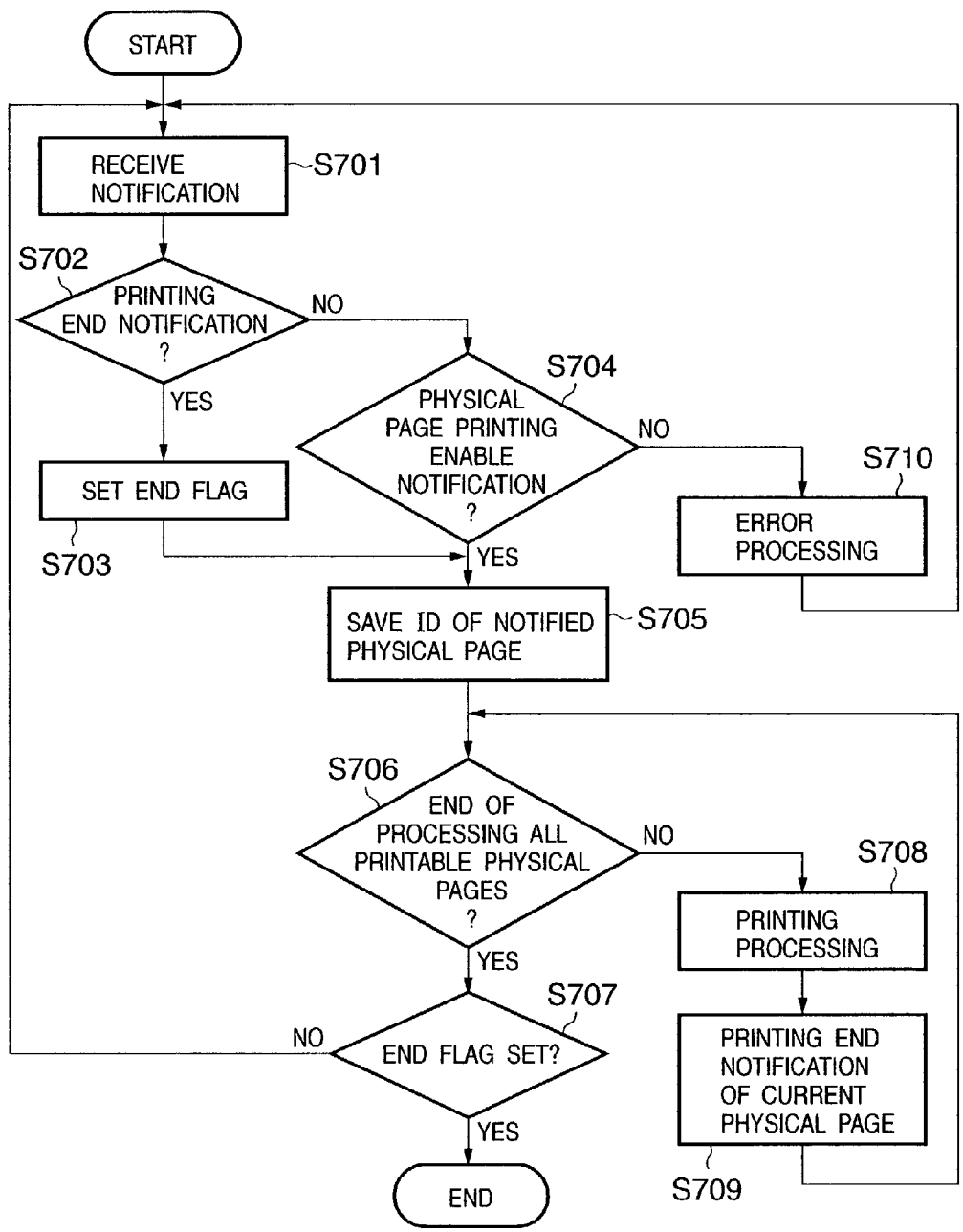
FIG. 7 is a flow chart showing a printing data generation process in a despooler 305.

FIG. 7 is a flow chart showing the printing data generation process in the despooler 305. In step S701, the despooler 305 receives a notification from the spool file manager 304. In step S702, the despooler 305 checks whether the received notification is a job end notification. If YES in step S702, the despooler 305 shifts to step S703, sets an end flag, and advances to step S705.

If NO in step S702, the despooler 305 shifts to step S704 and checks whether the notification is a printing start request of one physical page sent in step S608 shown in FIG. 6. If NO in step S704, the despooler 305 shifts to step S710, executes another processing (error processing), returns to step S701, and waits for the next notification. If YES in step S704, the despooler 305 shifts to step S705 and saves the ID of a printable physical page notified in step S704. In step S706, the despooler 305 checks whether printing processing of all the pages of physical page IDs saved in step S705 ends. If YES in step S706, the despooler 305 advances to step S707 and checks whether the end flag has been set in step S703. If YES in step S707, the despooler 305 determines that the job has ended, sends a processing end notification to the spool file manager 304, and ends the processing. If NO in step S707, the despooler 305 returns to step S701 and waits for the next notification.

If NO in step S706, the despooler 305 shifts to step S708 and sequentially reads out unprocessed physical page IDs from saved physical page IDs. The despooler 305 reads out information necessary to generate printing data of physical pages corresponding to the readout physical page IDs, and performs printing processing. In this printing processing, the despooler 305 converts a printing request instruction stored in the spool file 303 into a format (GDI function) recognizable by the graphic engine 202, and transfers the GDI function.

As for a processing setting (to be referred to as "N-page printing" hereinafter) of laying out a plurality of logical pages on one physical page, the despooler 305 converts information in consideration of a reduction arrangement in step S708. If necessary printing processing ends, the despooler 305 sends a printing data generation end notification of one physical page to the spool file manager 304. The despooler 305 returns to step S706 and repeats printing processing for all the printable physical page IDs saved in step S705.

In this manner, printing processing is executed by the dispatcher 301, spooler 302, spool file manager 304, and despooler 305. The application 201 is released from printing processing at a timing when the spooler 302 generates an intermediate code and stores it in the spool file 303. The processing time can be shortened in comparison with conventional printing processing in which data is directly output to the printer driver 203.

The spool file 303 temporarily saves an intermediate file (page description file or job setting file) considering the printing settings of the printer driver. This allows the user to recognize a printing preview to be actually printed, and to bind or rearrange printing jobs generated by a plurality of applications 201. Even printing settings can be changed by the user without reactivating the application 201.

In printing processing using the spooler 302, the despooler 305 generates a job output setting file in response to a printing request to the graphic engine 202. Also for preview, job binding, or the like, a job output setting file is generated. The job output setting file is identical to a job setting file for a single job, or is generated based on pieces of job setting information for a bound job.

The job output setting file in this embodiment will be explained.

FIG. 10 is a view showing an example of the job output setting file in the embodiment. This job output setting file saves information which constitutes a printable physical page generated by the spool file manager 304 in step S608 of FIG. 6. In FIG. 10, a field 1001 saves an ID for identifying a job, and can also hold information as a file name or shared memory name in which the information is saved. A field 1002 saves job setting information. The job setting information contains one information which can be set only for one job, such as a structure necessary for the graphic engine 202 to start printing the job, the designation of N-page printing, the designation of an additional drawing such as a page frame, or the finishing designation such as the number of copies or the staple. The job setting information holds necessary information in accordance with functions for a job.

A field 1003 saves the number of physical pages of a job, and represents that pieces of physical page information for the number of physical pages are saved in subsequent fields. Since the number of printable physical pages is announced in the embodiment, the printing system can operate without the field 1003. Pieces of physical page information for the number of physical pages saved in the field 1003 are stored in a field 1004 and subsequent fields. The physical page information will be described below with reference to FIG. 12.

FIG. 11 is a view showing an example of job setting information in the field 1002 shown in FIG. 10. In FIG. 11, a field 1101 saves all the physical pages, and a field 1002 saves all the logical pages. Pieces of information in the fields 1101 and 1102 can be used when page numbers are printed as additional information together with printing data. While printing continues, these fields hold provisional values, or the spool file manager 304 postpones creation of printable physical page information until the end of printing. A field 1103 saves information about the number of copies which designates the number of copies printed by a printing job. A field 1104 saves the designation of whether to print data for each copy when printing of a plurality of copies is set in the field 1103. A field 1105 saves finishing information such as a staple, punch, Z-folding, which is designated when a finisher is attached to the printer main body or arranged outside. A field 1106 saves information added to a job, such as an ornament such as a page frame, additional information such as a date, a user name, a page number, or digital watermark printing. As the number of functions increases, the number of fields contained in the job setting information also increases. For example, when double-side printing is possible, a field which saves the designation of double-side printing is added.

FIG. 12 is a view showing an example of physical page information in the field 1004 shown in FIG. 10. In FIG. 12, a first field 1201 saves a physical page number, and holds a value used to manage the printing order or additionally print a physical page number. A field 1202 saves physical page setting information, and when a layout or color/monochrome printing can be set for each physical page, saves a layout or color/monochrome setting. A field 1203 saves the number of logical pages assigned to a physical page, and when four pages are assigned to one physical page, saves "4" or an ID representing 4-page printing. A field 1204 and subsequent fields save the number of pieces of logical page information designated by the field 1203.

Depending on the number of pages printed by the application 201, the number of actual page data may be smaller than the number of pages designated by the field 1203. In this case, special data representing a null page is saved as logical page information.

Figure 13:
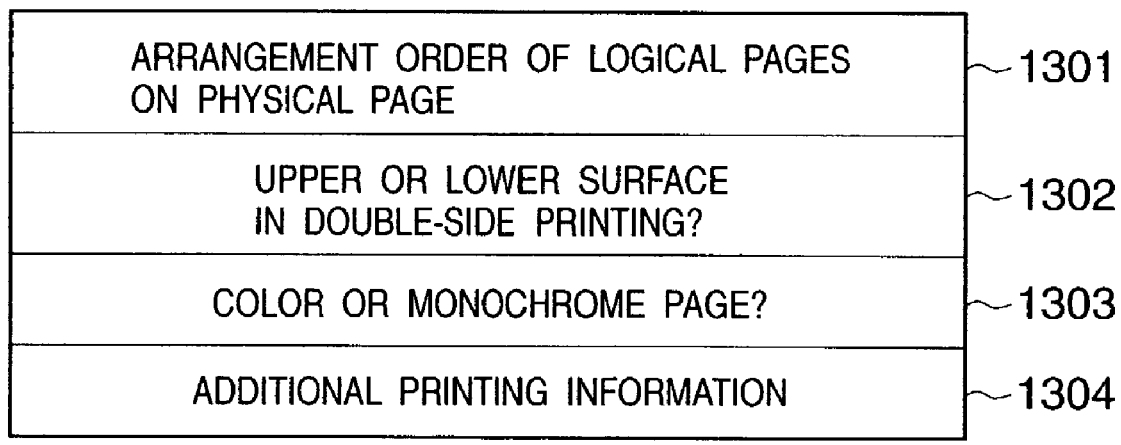
FIG. 13 is a view showing an example of physical page setting information in a field 1202 shown in FIG. 12.

FIG. 13 is a view showing an example of physical page setting information in the field 1202 shown in FIG. 12. In FIG. 13, a field 1301 saves the arrangement order of logical pages on a physical page, and holds the designation of the arrangement order (lateral from upper left, downward from upper left, or the like) of logical pages on a physical page in N-page printing. Depending on the system, the arrangement order set in the field 1301 may be replaced by arranging pieces of logical page information in the field 1204 and subsequent fields not in a page number order but in an arrangement order. A field 1302 saves upper-surface information and lower-surface information for double-side printing, and is used to align the margins of upper and lower surfaces. A field 1303 saves the designation of whether a page is color or monochrome, and is used when the printer has monochrome and color modes and a document which contains color and monochrome pages is to be printed in a color mode for color pages and a monochrome mode for monochrome pages. This information enables changing processing for each page in an auto-color mode in a color printer. That is, a color page can be transferred by rotating an intermediate transfer member (intermediate transfer drum or intermediate transfer belt) or a transfer member (transfer drum or transfer belt) by the number of device colors, e.g., four times for Y, M, C, and K colors. A monochrome page can be transferred by rotating only a black transfer member once. A field 1304 saves additional printing information, and is used to print additional information such as a page number or date on a physical page. Fields are also added for physical page setting information in accordance with the system function.

Figure 14:
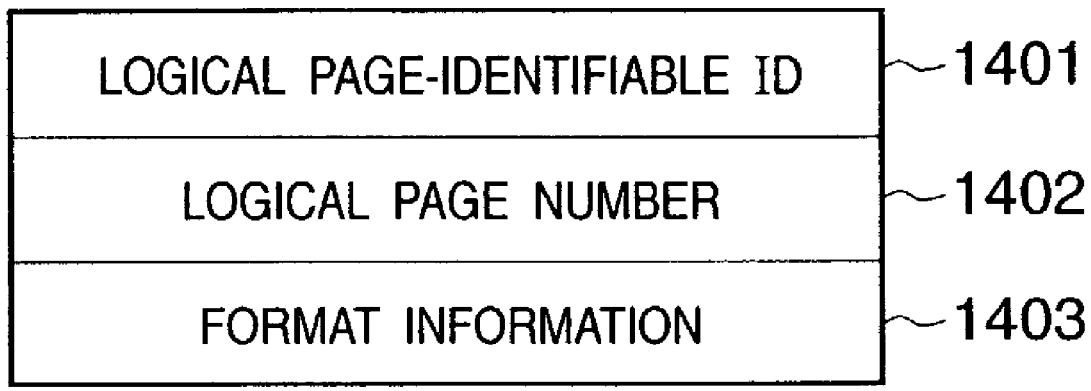
FIG. 14 is a view showing an example of logical page information in a field 1204 shown in FIG. 12.

FIG. 14 is a view showing an example of logical page information in the field 1204 shown in FIG. 12. In FIG. 14, a field 1401 saves a logical page ID, and the intermediate code of a page description file corresponding to a logical page is referred to from the spool file 303 by using the ID. As far as the intermediate code of a logical page can be accessed using the ID, the field 1401 may hold a file, a memory pointer, or an intermediate code itself which constitutes a logical page. A field 1402 saves a logical page number, and is used to print a logical page number as additional information or used as auxiliary information of a logical page ID. A field 1403 saves format information, and holds various setting items designable for each logical page. For example, the field 1403 saves additional printing information such as a page frame or information about various settings such as a scaling ratio designated for each logical page. If necessary, the field 1403 can save attribute information of a logical page such as color/monochrome information of each logical page. To the contrary, the field 1403 can be omitted in a system which does not change settings for each logical page or require any attribute information of each logical page.

The job output setting file has the above-described structure, and the job setting file has almost the same structure. The job setting file has, as jobs, a printing format (single-side printing, double-side printing, and bookbinding printing), a printing layout (Nup or posture printing), additional information (addition of a digital watermark, date, or user name), the number of copies, and sheet size information. For each physical page, the job setting file is formed from the arrangement order of logical pages, information representing an upper or lower surface in double-side printing, information representing a color mode, or the like.

A process which realizes the job setting change function of the setting change editor 307 shown in FIG. 3 will be explained in addition to the above-mentioned expanded system. In this embodiment, job setting contents are contained in a job setting file for a single job or in a job output setting file shown in FIG. 10 for a bound job. The job setting contents are independent of the spool file 303 which saves an intermediate code, and the job settings can be changed by changing a job output setting file. The setting change editor 307 realizes a job setting change function by changing a job output setting file singly or in cooperation with the spool file manager 304 or rewriting part of the file.

Figure 15:
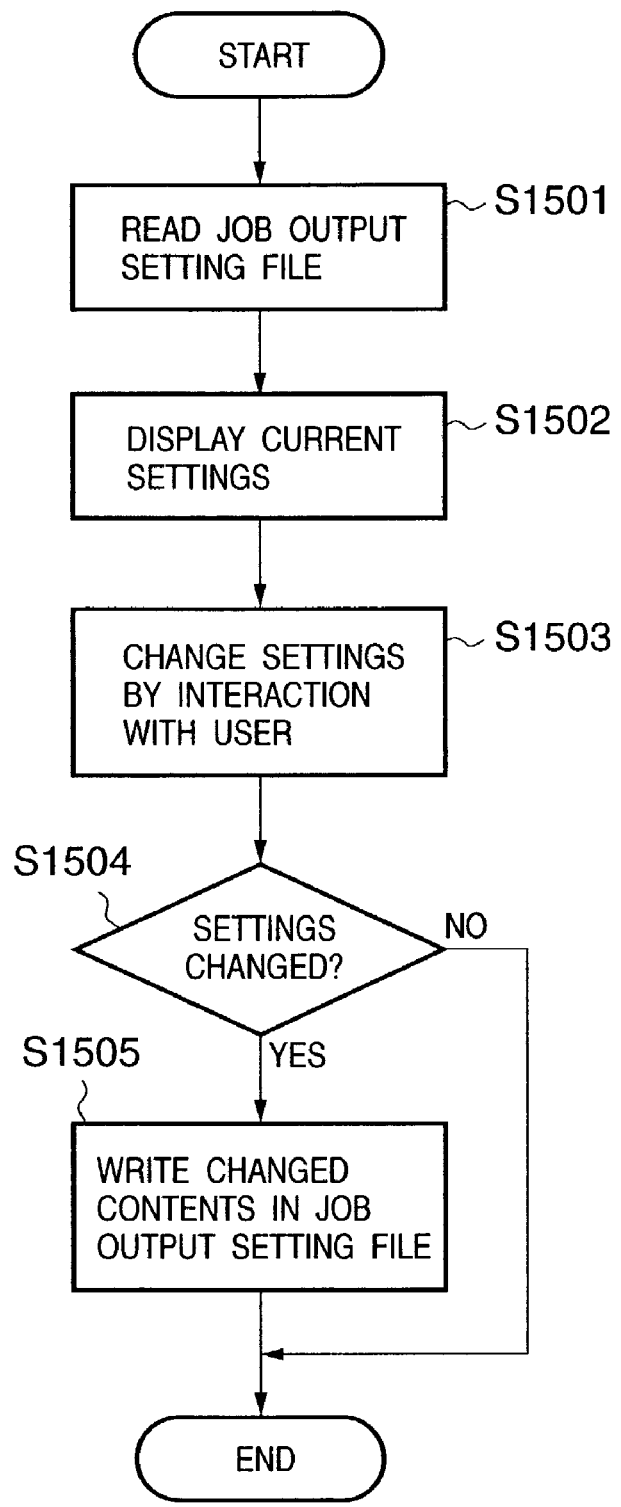
FIG. 15 is a flow chart showing a job setting change process in a setting change editor 307.

FIG. 15 is a flow chart showing the job setting change process in the setting change editor 307. In step S1501, the setting change editor 307 reads a job setting file or job output setting file. The job output setting file is the same as a file read in the previewer 306 and spool file 303. The contents of the read file are displayed to the user in step S1502, and an interaction is made with the user on a user interface as shown in FIG. 18 in step S1503, changing the setting contents in accordance with the designation of the above-described menu or the like. This step may be not the interactive process but a batch process of changing the contents in accordance with setting change contents written in a file or the like.

In step S1504, the setting change editor 307 compares the setting contents first read in step S1501 with the current setting contents and checks whether the setting contents have been changed. If YES in step S1504, the setting change editor 307 advances to step S1505 and generates a new job output setting file. The setting change editor 307 notifies the spool file manager 304 that the setting contents have been changed, and ends the processing. If NO in step S1504, the setting change editor 307 notifies the spool file manager 304 that the setting contents have not been changed, and ends the processing.

In this fashion, a new job output setting file is generated. When the user selects an "OK" button on the user interface window shown in FIG. 18, the new job output setting file becomes valid, and the old job output setting file is deleted. If the setting contents are changed not from the job output setting file but from the job setting file of a single job, the job output setting file is kept undeleted. When the user selects a "return to a default state" button on the user interface window shown in FIG. 18, the new job output setting file is deleted, and the old job output setting file becomes valid and is reflected on the display.

Note that the setting change editor 307 has been described as another module in the embodiment, but may be simply part of the user interface of the spool file manager 304. Instead of actually writing changed contents in the job output setting file by the setting change editor 307, the spool file manager 304 may be notified of only setting change contents and actually change the job output setting file.

An expansion for despooling and previewing a bound job will be explained in addition to the expanded system which binds a plurality of conventional printing jobs and prints them as one printing job.

In general, the spool file 303 in the intermediate code format is created for each job. For a single job, the intermediate codes of logical pages in a job file to be processed are sequentially read out and processed. The logical page ID in the field 1401 can be realized by a relative or absolute offset representing the specific position of each logical page in the file. For a bound job, the spool file 303 and page information belonging to the job must be specified from the job ID in the field 1401. In this embodiment, the spool file 303 is specified by adding an ID for identifying the spool file 303 to the logical page ID. In this case, only the field 1401 is changed because read of a page can be processed by the same logic as single-job processing as long as the spool file 303 can be identified. When the spool file 303 is saved in a different file format for each logical page, the file name of the logical page may be directly used as a logical page ID in the field 1401.

Processing of prompting the spool file manager 304 and despooler 305 of the host computer 3000 shown in FIG. 3 to issue a saddle stitch command, causing the printer driver 203 to transmit one printing job by using a job binder function (defined using a protocol), and causing the printer 1500 to execute fascicle bookbinding printing will be described.

The job binder function makes it possible to successively transmit PDL data and a saddle stitch command as a plurality of documents during a command which designates the start and end of one printing job transmitted from the printer driver 203 to the printer 1500.

Figure 19:
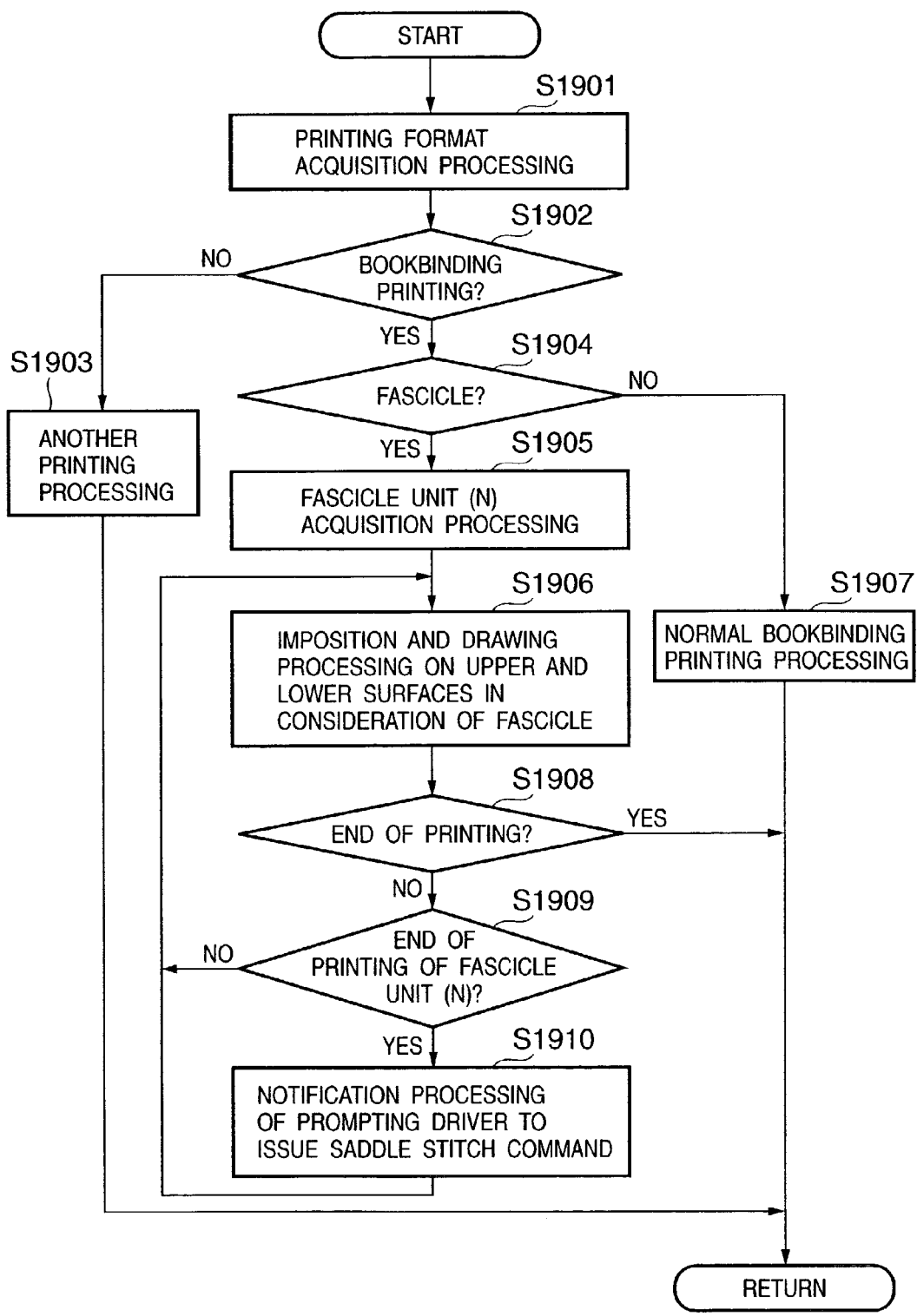
FIG. 19 is a flow chart showing fascicle bookbinding printing in a spool file manager 304 and despooler 305.

FIG. 19 is a flow chart showing fascicle bookbinding printing in the spool file manager 304 and despooler 305. In step S1901, the spool file manager 304 performs printing format acquisition processing in order to obtain a user-desired output format. In this processing, a job setting file is read in a series of printing processes described above to acquire a printing format. Information about the printing format contains information representing whether bookbinding printing is set, or information about details (fascicle, opening direction, and the like) of bookbinding printing. Based on this information, the following determination processing is done.

Figure 20A:
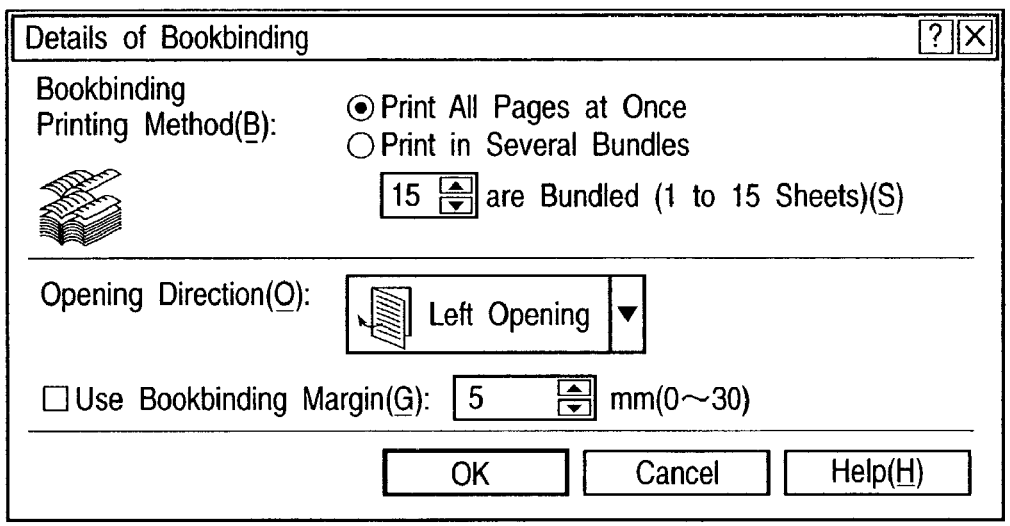
FIGS. 20A and 20B are views showing whether to designate fascicle setting of bookbinding printing.

In step S1902, the spool file manager 304 determines whether bookbinding printing is set. That is, the spool file manager 304 checks from the information acquired in step S1901 whether the printing format of the job is bookbinding. If NO in step S1902, the flow shifts to step S1903 to execute another printing processing. If YES in step S1902, the flow shifts to step S1904, and the spool file manager 304 checks from the information acquired in step S1901 whether fascicle printing is set. More specifically, if a designation ("print all pages at once") is made on the user interface as shown in FIG. 20A, the spool file manager 304 determines that no fascicle printing is set, and executes normal bookbinding printing processing in step S1907.

Figure 20B:
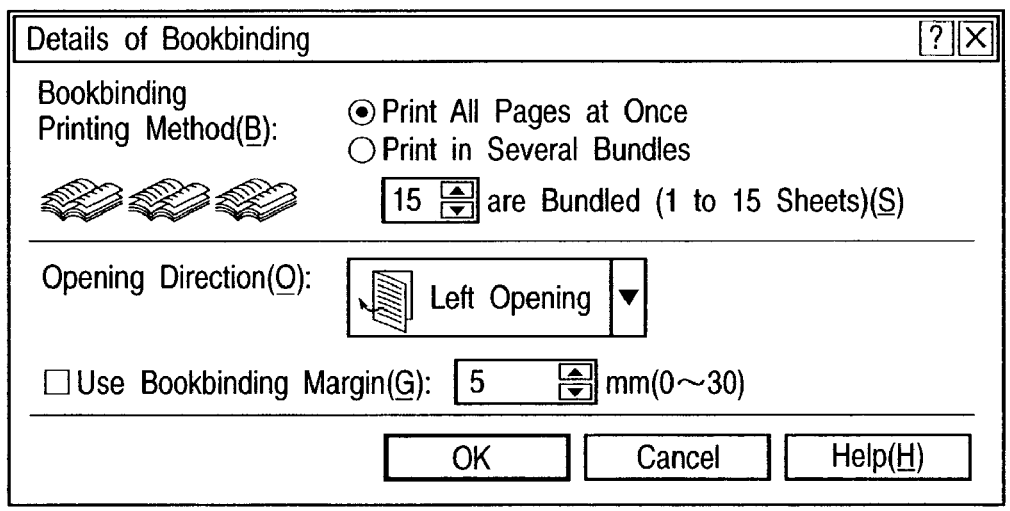

If a designation ("print in several bundles") is made on the user interface as shown in FIG. 20B in step S1904, the spool file manager 304 determines that fascicle printing is set, shifts to step S1905, and performs fascicle unit (N) acquisition processing. In this case, the number of sheets in each bookbinding processing operation is designated, and for example, the number of sheets is designated as shown in FIG. 20B. The number of sheets is 15 in the example shown in FIG. 20B, but is three in the following description.

In step S1906, the spool file manager 304 performs upper/lower-surface imposition processing in consideration of fascicle printing, and the despooler 305 performs drawing processing. As represented by 2102 shown in FIG. 21, the spool file manager 304 executes imposition processing on the upper or lower surface of a sheet in consideration of the fascicles of respective logical pages. The spool file manager 304 asks the despooler 305 for drawing, and the despooler 305 executes drawing processing. Since three fascicles are designated in this example, (1,12) has undergone imposition on the upper surface of the first sheet, (2,11) has undergone imposition on the lower surface for forward bookbinding, and drawing processing of these pages is performed.

In step S1908, the spool file manager 304 checks whether printing ends on the basis of the total number of pages. If NO in step S1908, the flow shifts to step S1909 to check whether fascicle printing ends. Since the number of sheets of each fascicle is three, as described above, whether three sheets have been printed is checked. If NO in step S1909, the flow returns to step S1906, and upper/lower-surface imposition processing and drawing processing are performed in consideration of a fascicle on the nest sheet. These processes are repeated until printing ends or the number of sheets of each fascicle is printed.

Figure 21:
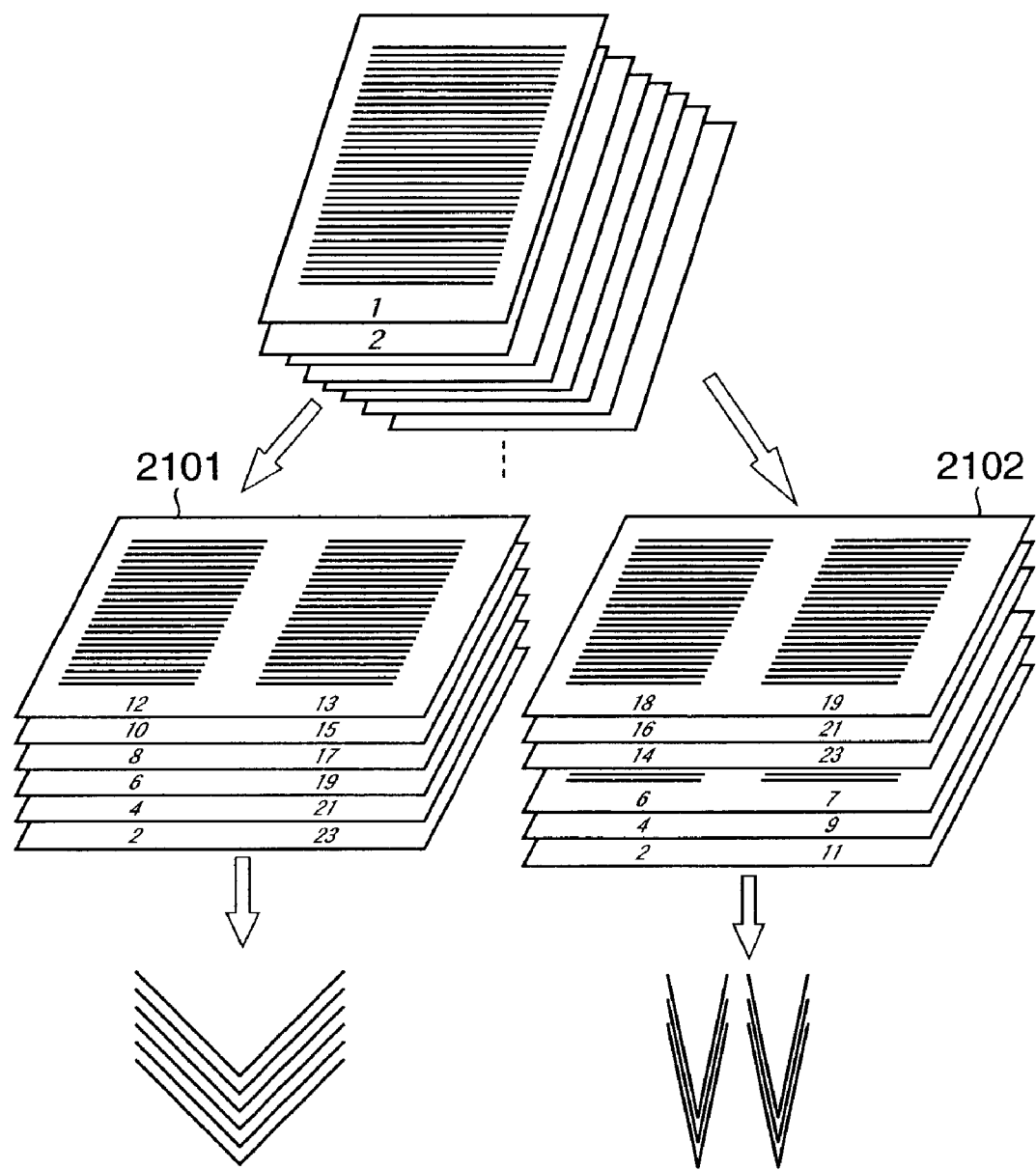
FIG. 21 is a view showing imposition processing for fascicles of bookbinding printing.

After the despooler 305 ends drawing processing on the third sheet in 2102 shown in FIG. 21, i.e., on a sheet with (5,8) on the upper surface and (6,7) on the lower surface, the flow shifts to step S1910, and the spool file manager 304 executes notification processing of prompting the printer driver 203 via the despooler 305 to issue a saddle stitch command. In this embodiment, a saddle stitch command to the device (printer 1500) is issued by the printer driver 203. To saddle-stitch each designated fascicle, the spool file manager 304 must prompt the printer driver 203 to issue a command. For this purpose, the spool file manager 304 performs notification processing. If data of the remaining fascicles exist in step S1910, the spool file manager 304 notifies the printer driver 203 of the presence of data of the remaining fascicles. The printer driver 203 adds job binding information in response to a request for the remaining fascicles issued from the spool file manager 304 via the despooler 305.

Figure 24:
FIG. 24 is a view showing the structure of printing data for explaining a printing job containing a plurality of fascicle data blocks generated by the printer driver.

Notification processing may be achieved by, e.g., an "escape function" prepared between the application 201 and the printer driver 203 or a unique interface (API). Upon reception of the notification, the printer driver 203 adds a saddle stitch request command to fascicle printing data in order to notify the device of the saddle stitch request. The printer driver 203 generates one printing job from printing data of respective fascicles by using a job binder function defined by a unique protocol. The printer driver 203 generates one printing job divided into a plurality of fascicle data blocks as shown in FIG. 24. A "saddle stitch request command" is added to each fascicle data block, and respective fascicle data blocks are bound by job binding information.

In this way, the printer driver 203 can generate one printing job obtained by binding data blocks to which saddle stitch request commands are added for respective fascicle printing data. The output apparatus such as a printer can saddle-stitch fascicles, and the device can receive a plurality of saddle stitch instructions from one printing job.

Notification processing which prompts the printer driver 203 to issue a saddle stitch command for each fascicle is performed by a total number of sheets. The printer driver can request the device to saddle-stitch each fascicle, realizing fascicle bookbinding printing by one printing job.

[Another Embodiment]

Another embodiment according to the present invention will be described in detail with reference to the accompanying drawings.

This embodiment realizes fascicle printing by one job by assigning part of processing to a printer driver 203 in addition to a spool file manager 304 and despooler 305.

Figure 22:
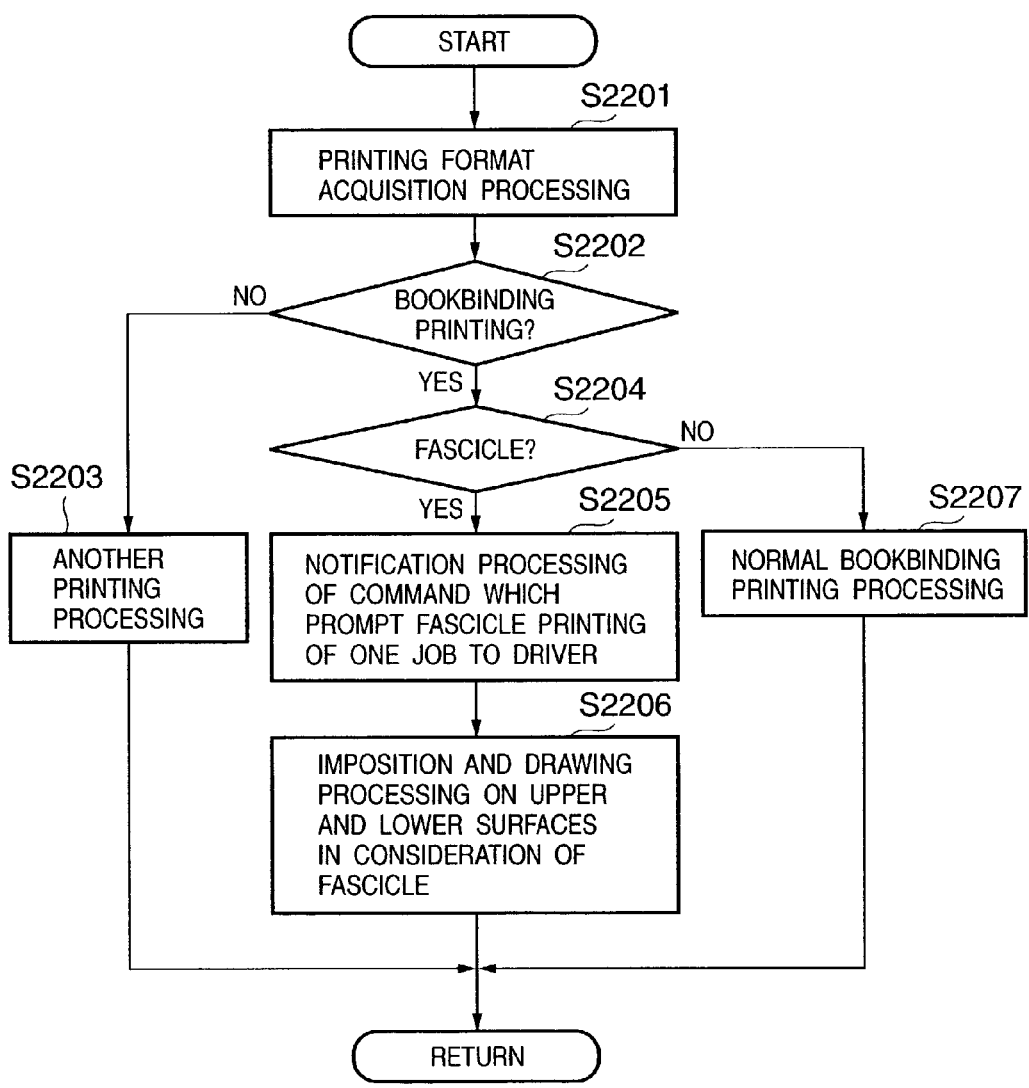
FIG. 22 is a flow chart showing fascicle bookbinding printing in the spool file manager 304 and despooler 305 according to another embodiment.
Figure 23:
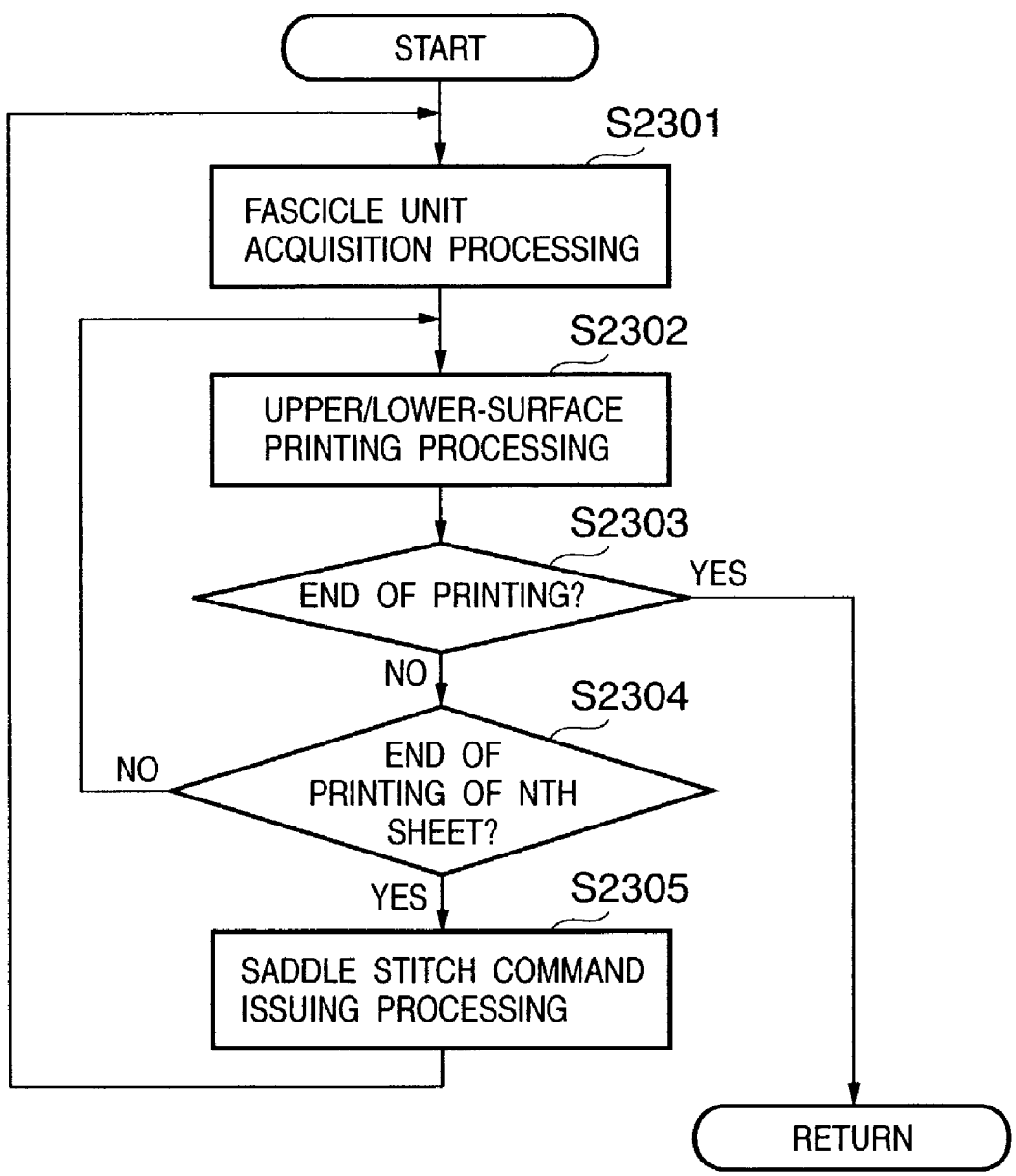
FIG. 23 is a flow chart showing fascicle bookbinding printing in a printer driver 203 according to the embodiment shown in FIG. 22.

FIG. 22 is a flow chart showing fascicle bookbinding printing in the spool file manager 304 and despooler 305 according to this embodiment. FIG. 23 is a flow chart showing fascicle bookbinding printing in the printer driver 203 according to this embodiment.

In step S2201 shown in FIG. 22, similar to the above-described embodiment, the spool file manager 304 performs printing format acquisition processing in order to obtain a user-desired output format. In this processing, a job setting file is read in a series of printing processes described above to acquire a printing format. Information about the printing format contains information representing whether bookbinding printing is set, or information about details (fascicle, opening direction, and the like) of bookbinding printing. Based on this information, the following determination processing is done.

In step S2202, the spool file manager 304 determines whether bookbinding printing is set. That is, the spool file manager 304 checks from the information acquired in step S2201 whether the printing format of the job is bookbinding. If NO in step S2202, the flow shifts to step S2203 to execute another printing processing. If YES in step S2202, the flow shifts to step S2204, and the spool file manager 304 checks from the information acquired in step S2201 whether fascicle printing is set. More specifically, if a designation ("print all pages at once") is made on the user interface as shown in FIG. 20A, the spool file manager 304 determines that no fascicle printing is set, and executes normal bookbinding printing processing in step S2207.

If a designation ("print in several bundles") is made on the user interface as shown in FIG. 20B in step S2204, the spool file manager 304 determines that fascicle printing is set, shifts to step S2205, and performs notification processing of a command which prompts fascicle printing of one job to the printer driver 203. This command is issued to make the printer driver 203 recognize fascicle printing of one job. The notification may be sent using an "escape" prepared between an application 201 and the printer driver 203 or a unique interface (API), similar to the above-described embodiment. Upon reception of the notification, the printer driver 203 recognizes a printing job to be sent as a fascicle job. Processing in the printer driver 203 will be described later.

In step S2206, the spool file manager 304 performs upper/lower-surface imposition processing in consideration of fascicle printing, and the despooler 305 performs drawing processing. As represented by 2102 shown in FIG. 21, drawing processing is done during fascicle imposition processing. In this case, the job need not be divided, or a notification need not be sent to the printer driver 203 for each fascicle. By merely executing imposition drawing considering fascicles, the fascicles can be printed.

Processing in the printer driver 203 which has received the command which prompts fascicle printing of one job will be explained with reference to FIG. 23.

In step S2301, the printer driver 203 performs fascicle unit (N) acquisition processing. In this processing, the printer driver 203 acquires a fascicle unit selected by "bundle every 15 sheets", as shown in FIG. 20B. Note that input information may be held in the printer driver 203 (DEVMODE or the like) or acquired from the spool file manager 304 or despooler 305. Assume that three sheets are designated, similar to the above-described embodiment.

In step S2302, the printer driver 203 executes upper/lower-surface printing processing. Similar to general processing, the printer driver 203 generates a printing job of a printer control language on the basis of drawing data (DDI function) sent from a graphic engine 202 of the OS. Drawing data sent from the graphic engine 202 has already undergone imposition for fascicle printing. The printer driver 203 need not be particularly aware of this processing.

In step S2303, the printer driver 203 checks whether printing job generation processing has ended for all fascicle data. If NO in step S2303, the printer driver 203 shifts to step S2304 and checks whether printing of the (N)th sheet of the fascicle unit has ended. In this processing, the printer driver 203 checks whether the number of sheets of the acquired fascicle unit have been printed. Since the fascicle unit is three sheets, upper/lower-surface printing processing (S2302) and printing end determination processing (S2304) are repeated until the third sheet is printed.

If the third sheet of the fascicle unit is printed in step S2304, the printer driver 203 advances to step S2305 and executes saddle stitch command issuing processing. That is, the printer driver 203 issues a saddle stitch command which causes the device (printer 1500) to actually bind a fascicle. Similar to the above-described embodiment, a plurality of saddle stitch requests can be issued for respective fascicle data blocks within one printing job.

Since the printer driver 203 issues a saddle stitch command for each fascicle, fascicle bookbinding printing can be realized by one printing job.

As described above, this embodiment can realize fascicle bookbinding printing by one printing job. The embodiment can prevent a plurality of printing jobs from appearing on a system spooler, and can stop printing by printing stop operation for one printing job.

Re-printing, copying, delete, or the like suffices to be designed for only one printing job in saving a printing job in a device box. Even a password or section ID suffices to be input for only one printing job. Further, a printing job containing a plurality of fascicle data can be canceled by designating cancellation of a job once because of one printing job regardless of the use of a print spooler provided by the OS instead of a unique job management utility.

The present invention may be applied to a system constituted by a plurality of devices (e.g., a host computer, interface device, reader, and printer) or an apparatus (e.g., a copying machine or facsimile apparatus) comprising a single device.

The object of the present invention is also achieved when a storage medium which stores software program codes for realizing the functions of the above-described embodiments is supplied to a system or apparatus and the computer (CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy disk, hard disk, optical disk, magnetooptical disk, CD-ROM, CD-R, CD-RW, DVD, magnetic tape, nonvolatile memory card, and ROM.

The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, the embodiments can realize a fascicle bookbinding printing function by one printing job.

The present invention is not limited to the above embodiments and various changes and modifications can be made within the spirit and scope of the present invention. Therefore, to apprise the public of the scope of the present invention the following claims are made.

What is claimed is:

1. An information processing apparatus for having an application and a printer driver for generating a single print job to be processed by a single printing apparatus, comprising:

first determination means for determining whether or not fascicle setting of bookbinding printing is designated, the fascicle setting of bookbinding printing indicating that saddle stitch is executed in fascicle units of a predetermined number of sheets;

imposition means for performing imposition processing on a plurality of printing surfaces on the basis of the fascicle setting when the fascicle setting of bookbinding printing is designated;

second determination means for determining whether or not a next fascicle data block exists when the imposition processing for a single fascicle data block terminates;

issuing means for issuing a saddle stitch command for the single fascicle data block that the imposition processing has terminated, and for issuing a job binding command to bind the single fascicle data block and the next fascicle data block as a single print job when it is determined by said second determination means that the next fascicle data block exists, wherein the fascicle data block is comprised of the saddle stitch command and fascicle data that the saddle stitch is performed; and job generation means for generating the single print job in which a plurality of fascicle data blocks have been bound by the job binding command issued by said issuing means, wherein the single print job is comprised of a job start command, a job end command and the plurality of fascicle data blocks.

2. The apparatus according to claim 1, wherein said first determination means determines that fascicle setting of bookbinding printing is designated when bookbinding printing in several bundles is designated.

3. The apparatus according to clam 1, wherein said first determination means determines that fascicle setting of bookbinding printing is not designated when bookbinding printing of printing all pages at once is designated.

4. The apparatus according to claim 1, further comprising combining means for combining the plurality of fascicle data blocks comprised of fascicle data and saddle stitch commands using job binding information in a case where one print job is generated using the plurality of fascicle data in which the imposition has undergone for each fascicle data by said imposition means.

5. A control method for an information processing apparatus for having an application and a printer driver for generating a single print job to be processed by a single printing apparatus, said method comprising the steps of:

determining whether or not fascicle setting of bookbinding printing is designated, the fascicle setting of bookbinding printing indicating that saddle stitch is executed in fascicle units of a predetermined number of sheets;

performing imposition processing on a plurality of printing surfaces on the basis of the fascicle setting when the fascicle setting of bookbinding printing is designated;

determining whether or not a next fascicle data block exists when the imposition processing for a single fascicle data block terminates;

issuing a saddle stitch command for the single fascicle data block that the imposition processing has terminated, and issuing a job binding command to bind the single fascicle data block and the next fascicle data block as a single print job when it is determined in said first determination step that the next fascicle data block exists, wherein the fascicle data block is comprised of the saddle stitch command and fascicle data that the saddle stitch is performed; and generating the single print job in which a plurality of fascicle data blocks have been bound by the job binding command issued in said issuing step, the single print job comprised of a job start command, a job end command and the plurality of fascicle data blocks.

6. The method according to claim 5, wherein in the first determination step, fascicle setting of bookbinding printing is determined to be designated when bookbinding printing in several bundles is designated.

7. The method according to claim 5, wherein in the first determination step, fascicle setting of bookbinding printing is determined not to be designated when bookbinding printing of printing all pages at once is designated.

8. The method according to claim 5, further comprising a combining step of combining the plurality of fascicle data blocks comprised of fascicle data and saddle stitch commands using job binding information in a case where one print job is generated using the plurality of fascicle data in which the imposition has undergone for each fascicle data in the imposition step.

9. A computer-readable medium for storing a program which performs the steps of:

determining whether fascicle setting of bookbinding printing is designated;

performing imposition processing on a plurality of printing surfaces as fascicle units on the basis of the fascicle setting when the fascicle setting of bookbinding printing is designated;

determining whether or not a next fascicle data block exists when the imposition processing for a single fascicle data block terminates;

issuing a saddle stitch command for the single fascicle data block that the imposition processing has terminated, and issuing a job binding command to bind the single fascicle data block and the next fascicle data block as a single print job when it is determined by said second determination in said second determination step the next fascicle data block exists, wherein the fascicle data block is comprised of the saddle stitch command and fascicle data that the saddle stitch is performed; and generating printing information as the single print job in which a plurality of fascicle data blocks have been bound by the job binding command issued in said issuing step, wherein the single print job is comprised of a job start command, a job end command and the plurality of fascicle data blocks.

* * * * *

UNITED STATES PATENT AND TRADEMARK OFFICE
CERTIFICATE OF CORRECTION

| | | |
|---|---|---|
| PATENT NO. | : 7,362,465 B2 | Page 1 of 1 |
| APPLICATION NO. | : 10/184900 | |
| DATED | : April 22, 2008 | |
| INVENTOR(S) | : Nishikawa et al. | |

It is certified that error appears in the above-identified patent and that said Letters Patent is hereby corrected as shown below:

ON THE TITLE PAGE:
At Item (75), Inventors, "Yasuo Mori, Kanagaw (JP)" should read --Yasuo Mori, Kanagawa (JP);--.

COLUMN 9:
Line 60, "to" should be deleted.

COLUMN 14:
Line 12, "instep S610, the spool filemanager" should read --in step S610, the spool file manager--.

COLUMN 19:
Line 34, "nest" should read --next--.

COLUMN 23:
Line 1, claim 3 "clam 1," should read --claim 1,--.

COLUMN 24:
Line 30, claim 9 "step" should read --step that--.

Signed and Sealed this

Seventh Day of October, 2008

JON W. DUDAS
*Director of the United States Patent and Trademark Office*